United States Patent
Xiu et al.

(10) Patent No.: US 12,177,448 B2
(45) Date of Patent: Dec. 24, 2024

(54) METHODS AND APPARATUSES FOR REFERENCE PICTURE RESAMPLING

(71) Applicant: BEIJING DAJIA INTERNET INFORMATION TECHNOLOGY CO., LTD., Beijing (CN)

(72) Inventors: Xiaoyu Xiu, San Diego, CA (US); Yi-Wen Chen, San Diego, CA (US); Tsung-Chuan Ma, San Diego, CA (US); Hong-Jheng Jhu, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 238 days.

(21) Appl. No.: 17/849,394

(22) Filed: Jun. 24, 2022

(65) Prior Publication Data

US 2023/0025503 A1    Jan. 26, 2023

Related U.S. Application Data

(63) Continuation of application No. PCT/US2020/067017, filed on Dec. 24, 2020.

(51) Int. Cl.
*H04N 19/132* (2014.01)
*H04N 19/117* (2014.01)
(Continued)

(52) U.S. Cl.
CPC ......... *H04N 19/132* (2014.11); *H04N 19/117* (2014.11); *H04N 19/176* (2014.11); *H04N 19/186* (2014.11); *H04N 19/503* (2014.11)

(58) Field of Classification Search
CPC .......................... H04N 19/132; H04N 19/117
(Continued)

(56) References Cited

U.S. PATENT DOCUMENTS

| 2021/0092457 A1* | 3/2021 | Luo ...................... H04N 19/176 |
| 2022/0272378 A1* | 8/2022 | Samuelsson ......... H04N 19/117 |

FOREIGN PATENT DOCUMENTS

| KR | 101895428 B1 | 9/2018 |
| KR | 1020190122883 A | 10/2019 |

OTHER PUBLICATIONS

EPOA1 issued to EP Application No. 20906043.3 dated Jun. 2, 2023, (7p).

(Continued)

*Primary Examiner* — Jeffery A Williams
(74) *Attorney, Agent, or Firm* — Arch & Lake LLP

(57) ABSTRACT

Methods, apparatuses, and non-transitory computer-readable storage mediums are provided for decoding a video signal. A decoder obtains a reference picture I associated with a video block within the video signal. The decoder may further obtain reference samples I(i,j) of the video block from a reference block in the reference picture I. The decoder may also obtain a first down-sampling filter and a second down-sampling filter to respectively generate luma and chroma inter prediction samples of the video block. The decoder may further obtain a third down-sampling filter and a fourth down-sampling filter to respectively generate the luma and chroma inter prediction samples of the video block when the video block is coded by affine mode. The decoder may also obtain inter prediction samples of the video block based on the third and fourth down-sampling filters being applied to the reference samples I(i,j).

16 Claims, 6 Drawing Sheets

(51) Int. Cl.
*H04N 19/176* (2014.01)
*H04N 19/186* (2014.01)
*H04N 19/503* (2014.01)

(58) Field of Classification Search
USPC .................. 375/240.02, 240.21, 240.29
See application file for complete search history.

(56) References Cited

OTHER PUBLICATIONS

EP Search Report issued to EP Application No. 20906043.3 dated May 26, 2023, (4p).
KROA1 issued to Korean Application No. 10-2022-7025722 dated Apr. 19, 2023 with English translation, (12p).
Xiu, Xiaoyu, et al., "On RPR down-sampling filters for affine mode", Joint Video Experts Team (JVET) of ITU-T SG 16 WP 3 and ISO/IEC JTC 1/SC 29/WG 11, Document: JVET-Q0517-r1, 17th Meeting Brussels, BE, Jan. 7-17, 2020, (12p).
Luo, Daniel, "Description of Core Experiment 1 (CE1): Reference picture resampling filters", Joint Video Experts Team (JVET) of ITU-T SG 16 WP 3 and ISO/IEC JTC 1/SC 29/WG 11, Document: JVET-O2021-v3, 15th Meeting: Gothenburg, SE, Jul. 3-12, 2019, (14p).
Luo, Jiancong et al., "CE1-related: Reference picture resampling filters", Joint Video Experts Team (JVET) of ITU-T SG 16 WP 3 and ISO/IEC JTC 1/SC 29/WG 11, Document: JVET-P0353-v5, 16th Meeting Geneva, CH, Oct. 1-11, 2019, (4p).
Search Report issued in Application No. 10-2022-7025722, dated Aug. 5, 2022, with Machine English translation, (16p).
J. Samuelsson et al., "AHG 8: Adaptive Resolution Change (ARC) with downsampling" Joint Video Experts Team (JVET) of ITU-T SG 16 WP 3 and ISO/IEC JTC 1/SC 29/WG 11,JVET-O0240-v1,15th Meeting: Gothenburg, SE, Jul. 3-12, 2019 (7p).

Jonatan Samuelsson et al., "CE1-1: RPR downsampling filter" Joint Video Experts Team (JVET) of ITU-T SG 16 WP 3 and ISO/IEC JTC 1/SC 29/WG 11,JVET-P0088, 16th Meeting: Geneva, CH, Oct. 1-1, 2019 (5p).
Jiancong Luo et al., "CE1-related: Reference picture resampling filters" Joint Video Experts Team (JVET) of ITU-T SG 16 WP 3 and ISO/IEC JTC 1/SC 29/WG 11,JVET-P0353-v5,16th Meeting: Geneva, CH, Oct. 1-1, 2019 (8p).
The First Office Action of the India Patent Application 202247042156, dated Oct. 20, 2022 with partial translation, (6p).
The First Office Action of the Japanese Patent Application 2022539074, dated Nov. 14, 2022 with English translation, (6p).
International Search Report and Written Opinion of PCT Application No. PCT/US2020/067017 dated Apr. 19, 2021, (9p).
Samuelsson, J. et al., "AHG8: Adaptive Resolution Change (ARC) with downsampling", JVET-O0240-v1, Joint Video Experts Team (JVET) of ITU-T SG 16 WP 3 and ISO/IEC JTC 1/SC 29/WG 11, 15 Meeting: Gotehburg, SE, Jul. 5, 2019, (7p).
Samuelsson, J. et al., "CE1-1: RPR downsampling filter", JVET-P0088, Joint Video Experts Team (JVET) of ITU-T SG 16 WP 3 and ISO/IEC JTC 1/SC 29/WG 11, 16th Meeting: Geneva, CH, Oct. 10, 2019 (5p).
Luo, Jiancong et al., "CE1-related: Reference picture resampling filters", JVET-P0353-v5, Joint Video Experts Team (JVET) of ITU-T SG 16 WP 3 and ISO/IEC JTC 1/SC 29/WG 11, 16th Meeting: Geneva, CH Oct. 10, 2019 (8p).
Luo, Daniel et al., "Description of Core Experiment 1 (CE1): Reference picture resampling filters", JVET-O2021-v3, Joint Video Experts Team (JVET) of ITU-T SG 16 WP 3 and ISO/IEC JTC 1/SC 29/ WG 11, 15th Meeting: Gothenburg, SE, Sep. 11, 2019, (15p).
Chen, Peisong et al., "AHG 8: Adaptive Resolution Change", JVET-O0303-v2, Joint Video Experts Team (JVET) of ITU-T SG 16 WP 3 and ISO/IEC JTC 1/SC 29/WG11, 15th Meeting: Gothenburg, SE, Jul. 5, 2019, (8p).

\* cited by examiner

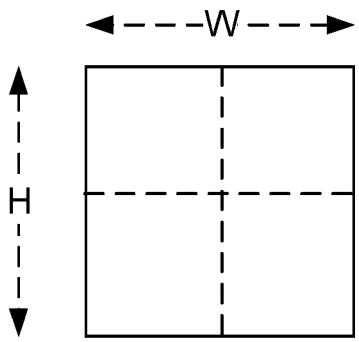
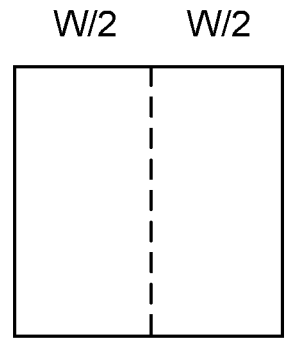
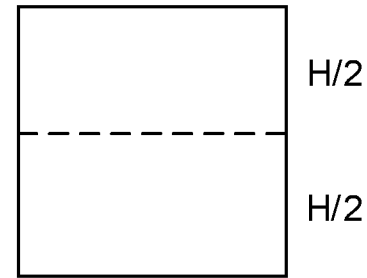
FIG. 3A     FIG. 3B     FIG. 3C
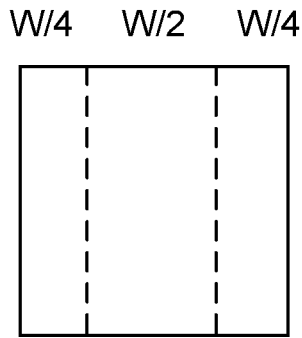
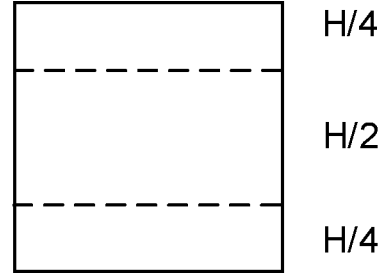
FIG. 3D     FIG. 3E
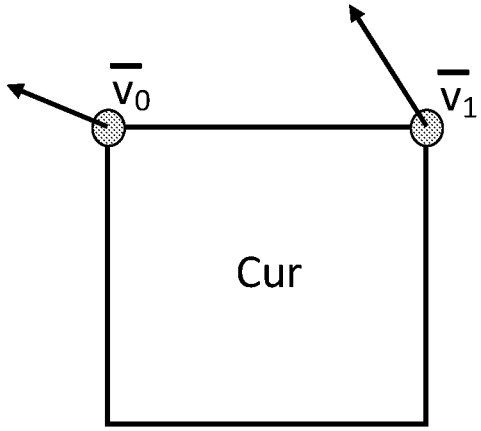
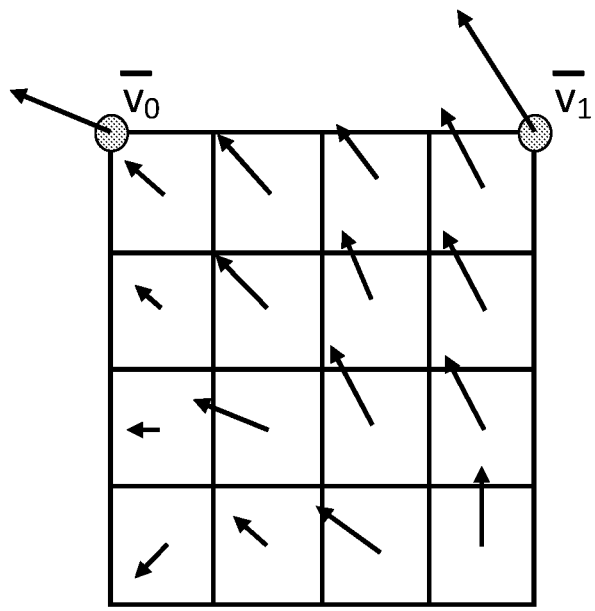
FIG. 4A     FIG. 4B

METHODS AND APPARATUSES FOR REFERENCE PICTURE RESAMPLING

CROSS-REFERENCE TO RELATED APPLICATIONS

This application is a continuation of International Application No.: PCT/US2020/067017, filed on Dec. 24, 2020, which is based upon and claims priority to Provisional Application No. 62/953,471 filed on Dec. 24, 2019, the entire disclosures of which are incorporated herein by reference for all purposes.

TECHNICAL FIELD

This disclosure is related to video coding and compression. More specifically, this disclosure relates to methods and apparatus on reference picture resampling technology for video coding.

BACKGROUND

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

SUMMARY

Examples of the present disclosure provide methods and apparatus for reference picture resampling.

According to a first aspect of the present disclosure, a method for decoding a video signal is provided. The method may include a decoder obtaining a reference picture I associated with a video block within the video signal. The decoder may also obtain reference samples I(i,j) of the video block from a reference block in the reference picture I. The i and j may represent a coordinate of one sample within the video block. The decoder may further obtain a first down-sampling filter and a second down-sampling filter to respectively generate luma and chroma inter prediction samples of the video block when the video block is coded in a non-affine inter mode and a resolution of the reference picture I is larger than that of a current picture. The decoder may also obtain a third down-sampling filter and a fourth down-sampling filter to respectively generate the luma and chroma inter prediction samples of the video block when the video block is coded by affine mode and the resolution of the reference picture is larger than that of the current picture. The decoder may further obtain inter prediction samples of the video block based on the third and fourth down-sampling filters being applied to the reference samples I(i,j).

According to a second aspect of the present disclosure, a computing device is provided. The computing device may include one or more processors, a non-transitory computer-readable memory storing instructions executable by the one or more processors. The one or more processors may be configured to obtain a reference picture I associated with a video block within the video signal. The one or more processors may also be configured to obtain reference samples I(i,j) of the video block from a reference block in the reference picture I. The i and j may represent a coordinate of one sample within the video block. The one or more processors may further be configured to obtain a first down-sampling filter and a second down-sampling filter to respectively generate luma and chroma inter prediction samples of the video block when the video block is coded in a non-affine inter mode and a resolution of the reference picture I is larger than that of a current picture. The one or more processors may also be configured to obtain a third down-sampling filter and a fourth down-sampling filter to respectively generate the luma and chroma inter prediction samples of the video block when the video block is coded by affine mode and the resolution of the reference picture is larger than that of the current picture. The one or more processors may further be configured to obtain inter prediction samples of the video block based on the third and fourth down-sampling filters being applied to the reference samples I(i,j).

According to a third aspect of the present disclosure, a non-transitory computer-readable storage medium having stored therein instructions is provided. When the instructions are executed by one or more processors of the apparatus, the instructions may cause the apparatus to obtain a reference picture I associated with a video block within the video signal. The instructions may also cause the apparatus to obtain reference samples I(i,j) of the video block from a reference block in the reference picture I. The i and j may represent a coordinate of one sample with the video block. The instructions may further cause the apparatus to obtain a first down-sampling filter and a second down-sampling filter to respectively generate luma and chroma inter prediction samples of the video block when the video block is coded in a non-affine inter mode and a resolution of the reference picture I is larger than that of a current picture. The instructions may also cause the apparatus to obtain a third down-sampling filter and a fourth down-sampling filter to respectively generate the luma and chroma inter prediction samples of the video block when the video block is coded by affine mode and the resolution of the reference picture is larger than that of the current picture. The instructions may further cause the apparatus to obtain inter prediction samples of the video block based on the third and fourth down-sampling filters being applied to the reference samples I(i,j).

It is to be understood that both the foregoing general description and the following detailed description are examples only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 3A is a diagram illustrating block partitions in a multi-type tree structure, according to an example of the present disclosure.

FIG. 3B is a diagram illustrating block partitions in a multi-type tree structure, according to an example of the present disclosure.

FIG. 3C is a diagram illustrating block partitions in a multi-type tree structure, according to an example of the present disclosure.

FIG. 3D is a diagram illustrating block partitions in a multi-type tree structure, according to an example of the present disclosure.

FIG. 3E is a diagram illustrating block partitions in a multi-type tree structure, according to an example of the present disclosure.

FIG. 4A is a diagram illustration of a 4-parameter affine model, according to an example of the present disclosure.

FIG. 4B is a diagram illustration of a 4-parameter affine model, according to an example of the present disclosure.

DETAILED DESCRIPTION

Figure 1:
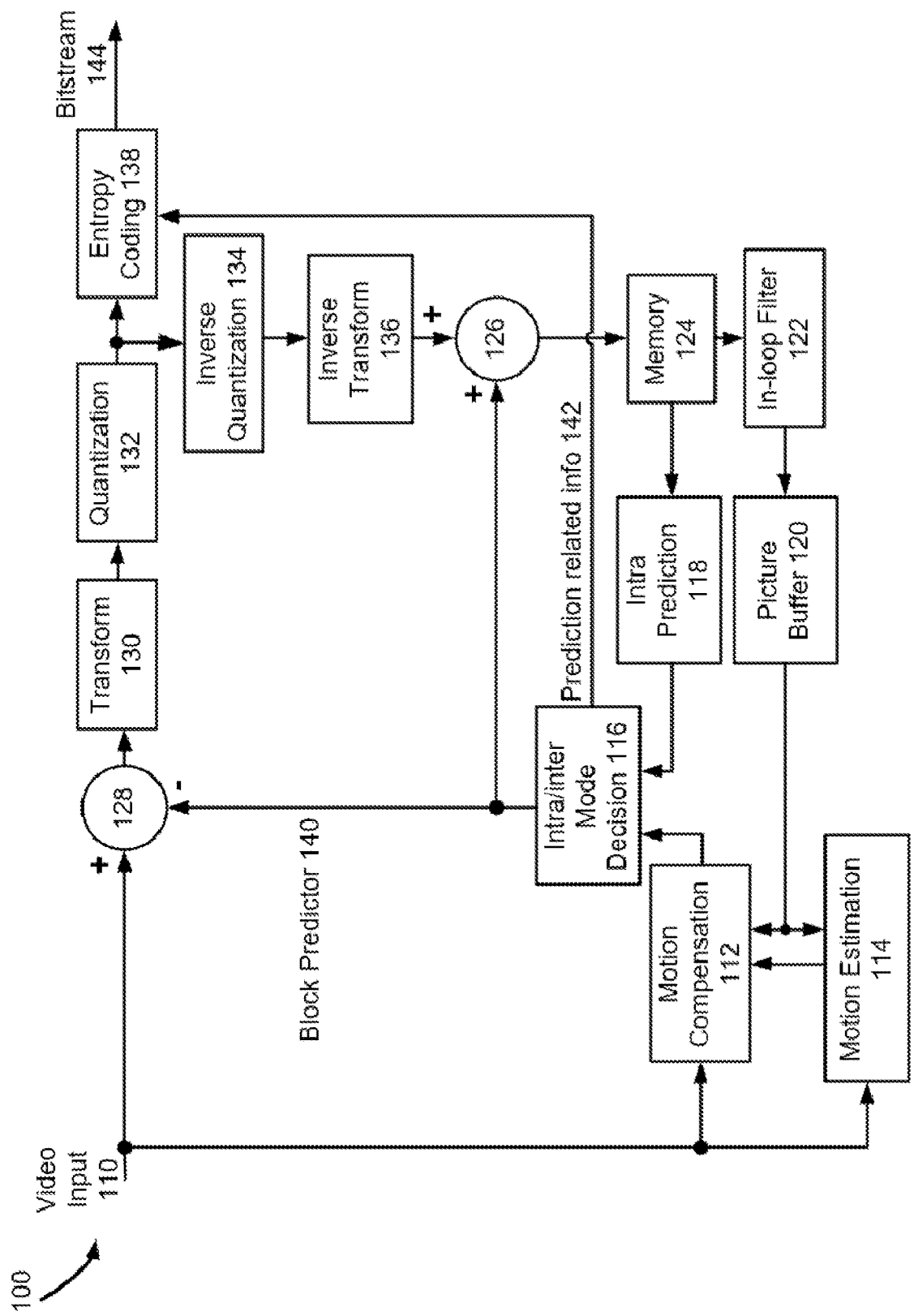
FIG. 1 is a block diagram of an encoder, according to an example of the present disclosure.

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the disclosure. Instead, they are merely examples of apparatuses and methods consistent with aspects related to the disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization. A Joint Video Exploration Team (JVET) was formed in October 2015 by ITU-T VECG and ISO/IEC MPEG to begin a significant study of advanced technologies that could enable substantial enhancement of coding efficiency. One reference software called joint exploration model (JEM) was maintained by the JVET by integrating several additional coding tools on top of the HEVC test model (HM).

In October 2017, the joint call for proposals (CfP) on video compression with capability beyond HEVC was issued by ITU-T and ISO/IEC. In April 2018, 23 CfP responses were received and evaluated at the 10-th JVET meeting, which demonstrated compression efficiency gain over the HEVC around 40%. Based on such evaluation results, the JVET launched a new project to develop the new generation video coding standard that is named as Versatile Video Coding (VVC). In the same month, one reference software codebase, called VVC test model (VTM), was established for demonstrating a reference implementation of the VVC standard.

Like HEVC, the VVC is built upon the block-based hybrid video coding framework.

FIG. 1 shows a general diagram of a block-based video encoder for the VVC. Specifically, FIG. 1 shows a typical encoder 100. The encoder 100 has video input 110, motion compensation 112, motion estimation 114, intra/inter mode decision 116, block predictor 140, adder 128, transform 130, quantization 132, prediction related info 142, intra prediction 118, picture buffer 120, inverse quantization 134, inverse transform 136, adder 126, memory 124, in-loop filter 122, entropy coding 138, and bitstream 144.

In the encoder 100, a video frame is partitioned into a plurality of video blocks for processing. For each given video block, a prediction is formed based on either an inter prediction approach or an intra prediction approach.

A prediction residual, representing the difference between a current video block, part of video input 110, and its predictor, part of block predictor 140, is sent to a transform 130 from adder 128. Transform coefficients are then sent from the Transform 130 to a Quantization 132 for entropy reduction. Quantized coefficients are then fed to an Entropy Coding 138 to generate a compressed video bitstream. As shown in FIG. 1, prediction related information 142 from an intra/inter mode decision 116, such as video block partition info, motion vectors (MVs), reference picture index, and intra prediction mode, are also fed through the Entropy Coding 138 and saved into a compressed bitstream 144. Compressed bitstream 144 includes a video bitstream.

In the encoder 100, decoder-related circuitries are also needed in order to reconstruct pixels for the purpose of prediction. First, a prediction residual is reconstructed through an Inverse Quantization 134 and an Inverse Transform 136. This reconstructed prediction residual is combined with a Block Predictor 140 to generate un-filtered reconstructed pixels for a current video block.

Spatial prediction (or "intra prediction") uses pixels from samples of already coded neighboring blocks (which are called reference samples) in the same video frame as the current video block to predict the current video block.

Temporal prediction (also referred to as "inter prediction") uses reconstructed pixels from already-coded video pictures to predict the current video block. Temporal prediction reduces temporal redundancy inherent in the video signal. The temporal prediction signal for a given coding unit (CU) or coding block is usually signaled by one or more MVs, which indicate the amount and the direction of motion between the current CU and its temporal reference. Further, if multiple reference pictures are supported, one reference picture index is additionally sent, which is used to identify from which reference picture in the reference picture storage, the temporal prediction signal comes from.

Motion estimation 114 intakes video input 110 and a signal from picture buffer 120 and output, to motion compensation 112, a motion estimation signal. Motion compensation 112 intakes video input 110, a signal from picture buffer 120, and motion estimation signal from motion estimation 114 and output to intra/inter mode decision 116, a motion compensation signal.

After spatial and/or temporal prediction is performed, an intra/inter mode decision 116 in the encoder 100 chooses the best prediction mode, for example, based on the rate-distortion optimization method. The block predictor 140 is then subtracted from the current video block, and the resulting prediction residual is de-correlated using the transform 130 and the quantization 132. The resulting quantized residual coefficients are inverse quantized by the inverse quantization 134 and inverse transformed by the inverse transform 136 to form the reconstructed residual, which is then added back to the prediction block to form the reconstructed signal of the CU. Further in-loop filtering 122, such as a de-blocking filter, a sample adaptive offset (SAO), and/or an adaptive in-loop filter (ALF) may be applied on the reconstructed CU before it is put in the reference picture storage of the picture buffer 120 and used to code future video blocks. To form the output video bitstream 144, coding mode (inter or intra), prediction mode information, motion information, and quantized residual coefficients are all sent to the entropy coding unit 138 to be further compressed and packed to form the bitstream.

FIG. 1 gives the block diagram of a generic block-based hybrid video encoding system. The input video signal is processed block by block (called CUs). In the VVC, a CU can be up to 128×128 pixels. However, different from the HEVC which partitions blocks only based on quad-trees, in the VVC, one coding tree unit (CTU) is split into CUs to adapt to varying local characteristics based on quad/binary/ternary-tree. Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure.

As shown in FIGS. 3A, 3B, 3C, 3D, and 3E, there are five splitting types, quaternary partitioning, horizontal binary partitioning, vertical binary partitioning, horizontal ternary partitioning, and vertical ternary partitioning.

FIG. 3A shows a diagram illustrating block quaternary partition in a multi-type tree structure, in accordance with the present disclosure.

FIG. 3B shows a diagram illustrating block vertical binary partition in a multi-type tree structure, in accordance with the present disclosure.

FIG. 3C shows a diagram illustrating block horizontal binary partition in a multi-type tree structure, in accordance with the present disclosure.

FIG. 3D shows a diagram illustrating block vertical ternary partition in a multi-type tree structure, in accordance with the present disclosure.

FIG. 3E shows a diagram illustrating block horizontal ternary partition in a multi-type tree structure, in accordance with the present disclosure.

In FIG. 1, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more MVs, which indicate the amount and the direction of motion between the current CU and its temporal reference. Also, if multiple reference pictures are supported, one reference picture index is additionally sent, which is used to identify from which reference picture in the reference picture storage the temporal prediction signal comes from. After spatial and/or temporal prediction, the mode decision block in the encoder chooses the best prediction mode, for example, based on the rate-distortion optimization method. The prediction block is then subtracted from the current video block; and the prediction residual is de-correlated using transform and quantized. The quantized residual coefficients are inverse quantized and inverse transformed to form the reconstructed residual, which is then added back to the prediction block to form the reconstructed signal of the CU. Further, in-loop filtering, such as deblocking filter, SAO and ALF may be applied on the reconstructed CU before it is put in the reference picture store and used to code future video blocks. To form the output video bitstream, coding mode (inter or intra), prediction mode information, motion information, and quantized residual coefficients are all sent to the entropy coding unit to be further compressed and packed to form the bitstream.

Figure 2:
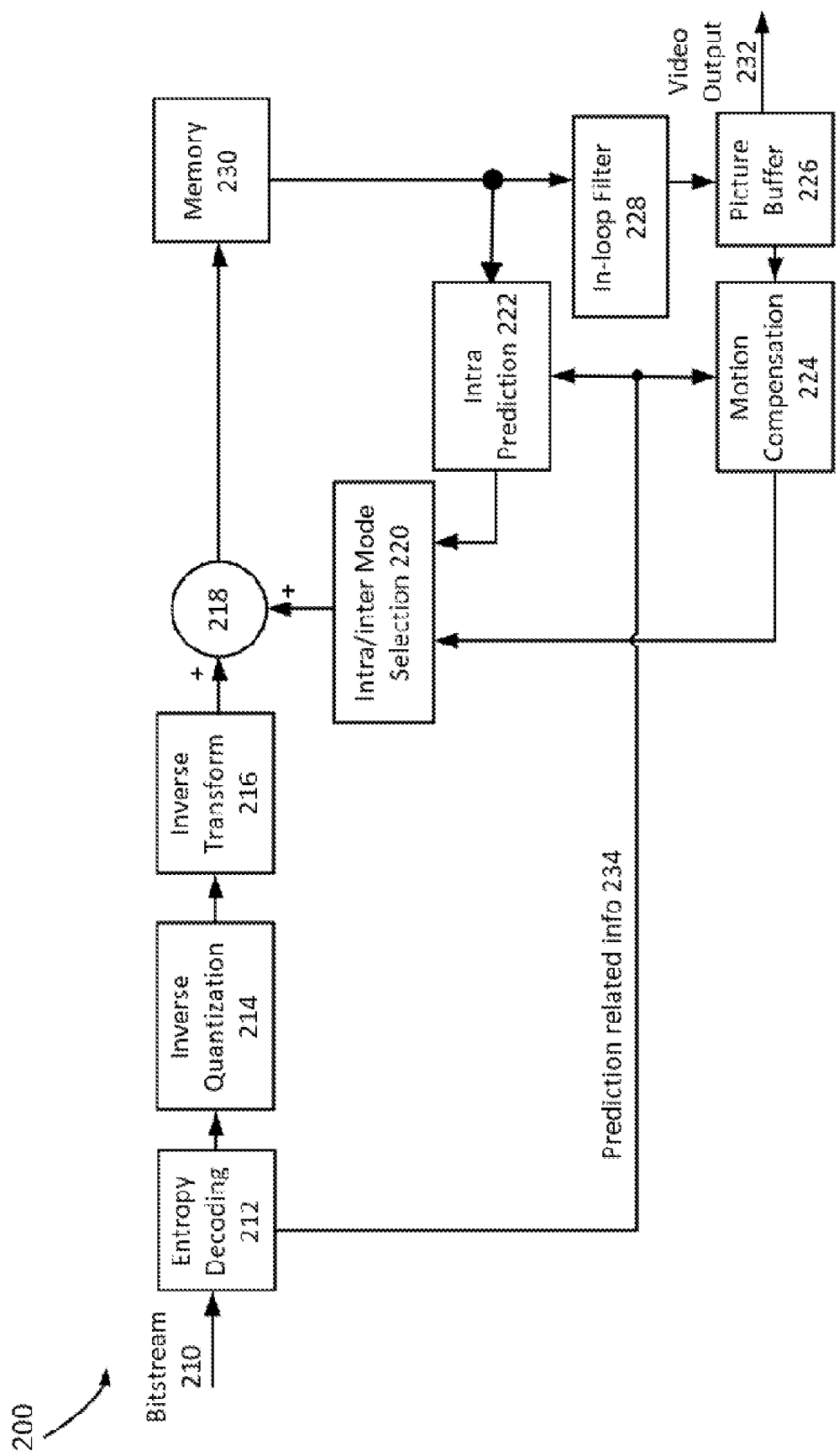
FIG. 2 is a block diagram of a decoder, according to an example of the present disclosure.

FIG. 2 shows a general block diagram of a video decoder for the VVC. Specifically, FIG. 2 shows a typical decoder 200 block diagram. Decoder 200 has bitstream 210, entropy decoding 212, inverse quantization 214, inverse transform 216, adder 218, intra/inter mode selection 220, intra prediction 222, memory 230, in-loop filter 228, motion compensation 224, picture buffer 226, prediction related info 234, and video output 232.

Decoder 200 is similar to the reconstruction-related section residing in the encoder 100 of FIG. 1. In the decoder 200, an incoming video bitstream 210 is first decoded through an Entropy Decoding 212 to derive quantized coefficient levels and prediction-related information. The quantized coefficient levels are then processed through an Inverse Quantization 214 and an Inverse Transform 216 to obtain a reconstructed prediction residual. A block predictor mechanism, implemented in an Intra/inter Mode Selector 220, is configured to perform either an Intra Prediction 222 or a Motion Compensation 224, based on decoded prediction information. A set of unfiltered reconstructed pixels is obtained by summing up the reconstructed prediction residual from the Inverse Transform 216 and a predictive output generated by the block predictor mechanism, using a summer 218.

The reconstructed block may further go through an In-Loop Filter 228 before it is stored in a Picture Buffer 226, which functions as a reference picture store. The reconstructed video in the Picture Buffer 226 may be sent to drive a display device, as well as used to predict future video blocks. In situations where the In-Loop Filter 228 is turned on, a filtering operation is performed on these reconstructed pixels to derive a final reconstructed Video Output 232.

FIG. 2 gives a general block diagram of a block-based video decoder. The video bitstream is a first entropy decoded at an entropy decoding unit. The coding mode and prediction information are sent to either the spatial prediction unit (if intra coded) or the temporal prediction unit (if inter-coded) to form the prediction block. The residual transform coefficients are sent to the inverse quantization unit and inverse transform unit to reconstruct the residual block. The prediction block and the residual block are then added together. The reconstructed block may further go through in-loop filtering before it is stored in the reference picture storage. The reconstructed video in the reference picture storage is then sent out to drive a display device, as well as used to predict future video blocks.

The focus of the disclosure is to improve and simplify the existing design of reference picture resampling that is supported in the VVC. In the following, the current coding tools in the VVC that are closely related to the proposed technologies of the disclosure are briefly reviewed.

Affine Mode

In HEVC, only the translation motion model is applied for motion compensated prediction. While in the real world, there are many kinds of motion, e.g., zoom in/out, rotation, perspective motions, and other irregular motions. In the VVC, affine motion compensated prediction is applied by signaling one flag for each inter coding block to indicate whether the translation motion or the affine motion model is applied for inter prediction. In the current VVC design, two affine modes, including 4-parameter affine mode and 6-parameter affine mode, are supported for one affine coding block.

The 4-parameter affine model has the following parameters: two parameters for translation movement in horizontal and vertical directions, respectively, one parameter for zoom motion and one parameter for rotation motion for both directions. A horizontal zoom parameter is equal to a vertical zoom parameter. The horizontal rotation parameter is equal to the vertical rotation parameter. To achieve a more efficient affine parameter signaling, in the VVC, those affine parameters are derived through two MVs (which are also called control point motion vector (CPMV)) located at the top-left corner and top-right corner of a current block.

As shown in FIGS. 4A and 4B, the affine motion field of the block is described by two control point MVs ($V_0$, $V_1$).

FIG. 4A shows an illustration of a 4-parameter affine model. FIG. 4B shows an illustration of a 4-parameter affine model. Based on the control point motion, the motion field ($v_x$, $v_y$) of one affine coded block is described as $$v_x = \frac{(v_{1x} - v_{0x})}{w} x - \frac{(v_{1y} - v_{0y})}{w} y + v_{0x}$$
$$v_y = \frac{(v_{1y} - v_{0y})}{w} x + \frac{(v_{1x} - v_{0x})}{w} y + v_{0y}$$
(1)

The 6-parameter affine mode has the following parameters: two parameters for translation movement in horizontal and vertical directions, respectively, one parameter for zoom motion and one parameter for rotation motion in the horizontal direction, one parameter for zoom motion and one parameter for rotation motion in the vertical direction. The 6-parameter affine motion model is coded with three CPMVs.

Figure 5:
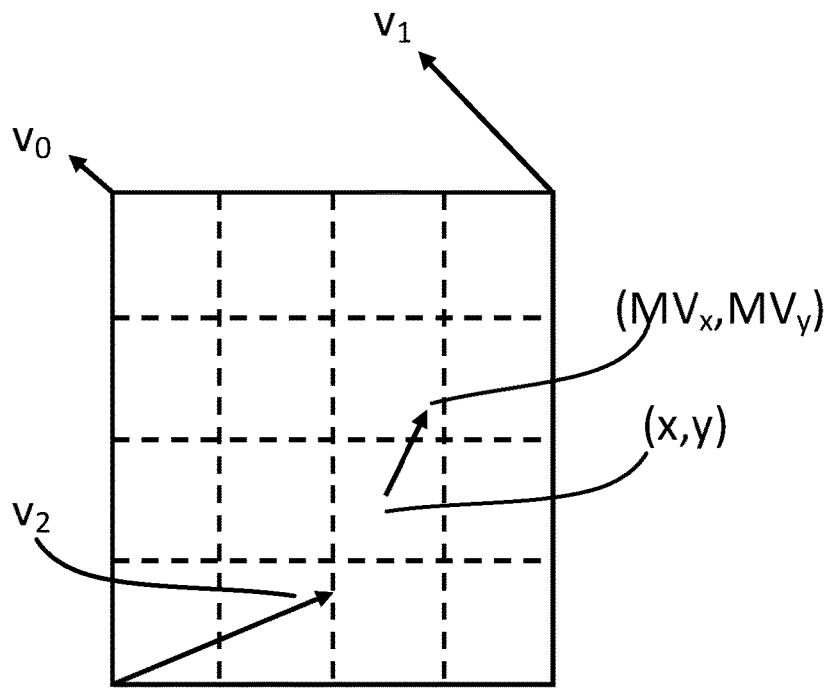
FIG. 5 is a diagram illustration of a 6-parameter affine model, according to an example of the present disclosure.

FIG. 5 shows an illustration of a 6-parameter affine model. As shown in FIG. 5, three control points of one 6-parameter affine block are located at the top-left, top-right, and bottom-left corner of the block. The motion at the top-left control point is related to translation motion, and the motion at the top-right control point is related to rotation and zoom motion in a horizontal direction, and the motion at the bottom-left control point is related to rotation and zoom motion in a vertical direction. Compared to the 4-parameter affine motion model, the rotation and zoom motion in the horizontal direction of the 6-parameter may not be the same as those motion in the vertical direction. Assuming ($V_0$, $V_1$, $V_2$) are the MVs of the top-left, top-right, and bottom-left corners of the current block in FIG. 5, the motion vector of each sub-block ($v_x$, $v_y$) is derived using three MVs at control points as:

$$v_x = v_{0x} + (v_{1x} - v_{0x}) * \frac{x}{w} + (v_{2x} - v_{0x}) * \frac{y}{h}$$
$$v_y = v_{0y} + (v_{1y} - v_{0y}) * \frac{x}{w} + (v_{2y} - v_{0y}) * \frac{y}{h}$$
(2)

In the VVC, the CPMVs of affine coding blocks are stored in a separate buffer. The stored CPMVs are only used for the generation of the affine CPMV predictors of affine merge mode (i.e., inheriting affine CPMVs from that of neighboring affine blocks) and affine explicit mode (i.e., signaling the affine CPMVs based on a prediction-based scheme). The sub-block MVs derived from CPMVs are used for motion compensation, MV prediction of translational MVs, and de-blocking.

Similar to the motion compensation of regular inter blocks, the MVs of each affine subblock may direct to reference samples at fractional sample positions. In such a case, the interpolation filtering process is needed to generate fractional pixel position reference samples. In order to control the worst-case memory bandwidth requirement and the worst-case computational complexity of interpolation, a set of 6-tap interpolation filters are used for the motion compensation of affine subblocks. Tables 1 and 2 illustrate the interpolation filters that are used for the motion compensations of regular inter blocks and affine blocks, respectively. As can be seen, the 6-tap interpolation filters used for the affine mode are derived directly from the 8-tap filters used for regular inter blocks by directly adding two outermost filter coefficients on each side of 8-tap filters into one single filter coefficient for 6-tap filters, i.e., the filter coefficients P0 and P5 in Table 2 are equal to the sum of the filter coefficients P0 and P1 and the sum of the filter coefficients P6 and P7 in Table 1, respectively.

TABLE 1

Luma interpolation filters used for regular inter blocks

| Fractional position | interpolation filter coefficients | | | | | | | |
|---|---|---|---|---|---|---|---|---|
| | P0 | P1 | P2 | P3 | P4 | P5 | P6 | P7 |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |
| 7 | −1 | 4 | −11 | 45 | 34 | −10 | 4 | −1 |
| 8 | −1 | 4 | −11 | 40 | 40 | −11 | 4 | −1 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |

TABLE 1-continued

Luma interpolation filters used for regular inter blocks

| Fractional position | interpolation filter coefficients | | | | | | | |
|---|---|---|---|---|---|---|---|---|
| | P0 | P1 | P2 | P3 | P4 | P5 | P6 | P7 |
| 14 | 0 | 1 | −3 | 8 | 62 | −5 | 2 | −1 |
| 15 | 0 | 1 | −2 | 4 | 63 | −3 | 1 | 0 |

TABLE 2

Luma interpolation filters used for affine blocks

| Fractional position | interpolation filter coefficients | | | | | |
|---|---|---|---|---|---|---|
| | P0 | P1 | P2 | P3 | P4 | P5 |
| 1 | 1 | −3 | 63 | 4 | −2 | 1 |
| 2 | 1 | −5 | 62 | 8 | −3 | 1 |
| 3 | 2 | −8 | 60 | 13 | −4 | 1 |
| 4 | 3 | −10 | 58 | 17 | −5 | 1 |
| 5 | 3 | −11 | 52 | 26 | −8 | 2 |
| 6 | 2 | −9 | 47 | 31 | −10 | 3 |
| 7 | 3 | −11 | 45 | 34 | −10 | 3 |
| 8 | 3 | −11 | 40 | 40 | −11 | 3 |
| 9 | 3 | −10 | 34 | 45 | −11 | 3 |
| 10 | 3 | −10 | 31 | 47 | −9 | 2 |
| 11 | 2 | −8 | 26 | 52 | −11 | 3 |
| 12 | 1 | −5 | 17 | 58 | −10 | 3 |
| 13 | 1 | −4 | 13 | 60 | −8 | 2 |
| 14 | 1 | −3 | 8 | 62 | −5 | 1 |
| 15 | 1 | −2 | 4 | 63 | −3 | 1 |

Additionally, for the motion compensation of chroma samples, the same 4-tap interpolation filters (as illustrated in Table 3) that are used for regular inter blocks are used for affine blocks.

TABLE 3

Chroma interpolation filters used for inter blocks
(i.e., affine blocks and non-affine blocks)

| Fractional sample | interpolation filter coefficients | | | |
|---|---|---|---|---|
| | P0 | P1 | P2 | P3 |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |

TABLE 3-continued

Chroma interpolation filters used for inter blocks
(i.e., affine blocks and non-affine blocks)

| Fractional sample | interpolation filter coefficients | | | |
|---|---|---|---|---|
| | P0 | P1 | P2 | P3 |
| 29 | −1 | 7 | 60 | −2 |
| 30 | 0 | 4 | 62 | −2 |
| 31 | 0 | 2 | 63 | −1 |

Reference Picture Resampling

Unlike the HEVC, the emerging VVC standard supports fast spatial resolution switching within the bitstream of one same content. Such capability is referred to as reference picture resampling (RPR) or adaptive resolution switch (ARC). In real-time video applications, allowing resolution change within one coded video sequence without the requirement of inserting a picture that supports random access, or Intra Random Access Point (IRAP) picture (e.g., an IDR picture, or an CRA picture, etc.) can not only adapt the compressed video data to dynamic communication channel condition but also avoid the burst of bandwidth consumption due to the relatively large size of IDR or CRA pictures. Specifically, the following typical user cases could benefit from the RPR feature:

Rate adaption in video telephony and conferencing: For adapting the coded video to the changing network conditions, when the network condition gets worse so that available bandwidth becomes lower, the encoder may adapt to it by encoding smaller resolution pictures. Currently, changing picture resolution can be done only after an IRAP picture; this has several issues. An TRAP picture at reasonable quality will be much larger than an inter-coded picture, and will be correspondingly more complex to decode: this costs time and resource. This is a problem if the resolution change is requested by the decoder for loading reasons. It can also break low-latency buffer conditions, forcing an audio re-sync, and the end-to-end delay of the stream will increase, at least temporarily. This can give a poor user experience.

Active speaker changes in multi-party video conferencing: For multi-party video conferencing, it is common that the active speaker is shown in a bigger video size than the video for the rest of the conference participants. When the active speaker changes, picture resolution for each participant may also need to be adjusted. The need to have ARC feature becomes more important when such a change in active speaker happens frequently.

Fast start in streaming: For streaming application, it is common that the application would buffer up to a certain length of the decoded picture before start displaying. Starting the bitstream with a smaller resolution would allow the application to have enough pictures in the buffer to start displaying faster.

Adaptive stream switching in streaming: The Dynamic Adaptive Streaming over HTTP (DASH) specification includes a feature named @mediaStreamStructureId. This enables switching between different representations at open-GOP random access points with non-decodable leading pictures, e.g., CRA pictures with associated RASL pictures in HEVC. When two different representations of the same video have different bit-rates but the same spatial resolution while they have the same value of @mediaStreamStructureId, switching between the two representations at a CRA picture with associated RASL pictures can be performed, and the RASL pictures associated with the switching—at CRA pictures can be decoded with acceptable quality hence enabling seamless switching. With ARC, the @mediaStreamStructureId feature would also be usable for switching between DASH representations with different spatial resolutions.

At the 15th JVET meeting, the RPR feature was formally supported by the VVC standard. The main aspects of the existing RPR design in the VVC are summarized as follows:

RPR High-Level Signaling

According to the current RPR design, in the sequence parameter set (SPS), two syntax elements pic_width_max_in_luma_samples and pic_height_max_in_luma_samples are signaled to specify the maximum width and height of the coded pictures that refer to the SPS. Then, when the picture resolution is changed, one new picture parameter set (PPS) needs to be set when the related syntax elements pic_width_in_luma_samples and pic_height_in_luma_samples are signaled to specify the different picture resolutions of the pictures referring to the PPS. There is bitstream conformance that the values of pic_width_in_luma_sample and pic_height_in_luma_sample should not exceed that of pic_width_max_in_luma_samples and pic_height_max_in_luma_samples. Table 4 illustrates the RPR-related signaling in the SPS and PPS.

TABLE 4

The RPR signaling in the SPS and PPS

| | Descriptor |
|---|---|
| seq_parameter_set_rbsp( ) { | |
| ... | |
| pic_width_max_in_luma_samples | ue(v) |
| pic_height_max_in_luma_samples | ue(v) |
| ... | |
| } | |

| | Descriptor |
|---|---|
| pic_parameter_set_rbsp( ) { | |
| ... | |
| pic_width_in_luma_samples | ue(v) |
| pic_height_in_luma_samples | ue(v) |
| ... | |
| } | |

Reference Picture Resampling Process

When there is a resolution change within one bitstream, a current picture may have one or more reference pictures in different sizes. According to the current RPR design, when picture resolution changes, all MVs to the current picture are normalized to the sample grid of the current picture instead of that of the reference pictures. This can make picture resolution changes transparent to the MV prediction process.

When picture resolution changes, in addition to MVs, the samples in one reference block have to be up-sampled/down-sampled during the motion compensation of the current block. In the VVC, the scaling ratio, i.e., refPicWidthInLumaSample/picWidthInLuma and refPicHeightInLumaSample/picHeightInLumaSample, is limited to the range [1/8, 2].

In the current RPR design, different interpolation filters are applied to interpolate the reference samples when the current picture and its reference picture are in different resolutions. Specifically, when the resolution of the reference picture is equal to or smaller than that of the current picture, the default 8-tap and 4-tap interpolation filters are used to generate the inter prediction samples of luma and chroma samples, respectively. However, the default motion interpolation filters do not present strong low-pass characteristics. When the resolution of the reference picture is higher than that of the current picture, using the default motion interpolation filters will lead to non-negligible aliasing which becomes more severe when the down-sampling ratio is increased. Correspondingly, to improve the inter prediction efficiency of the RPR, two different sets of down-sampling filters are applied when the reference picture is of higher resolution than the current picture. In details, when the down-sampling ratio is equal to or greater than 1.5:1, the following 8-tap and 4-tap Lanczos filters as shown in Table 5 and Table 6 are used.

TABLE 5

Luma interpolation filters when down-sampling ratio is equal to or greater than 1.5:1

| Fractional sample | interpolation filter coefficients | | | | | | | |
|---|---|---|---|---|---|---|---|---|
| | P0 | P1 | P2 | P3 | P4 | P5 | P6 | P7 |
| 0 | −1 | −5 | 17 | 42 | 17 | −5 | −1 | 0 |
| 1 | 0 | −5 | 15 | 41 | 19 | −5 | −1 | 0 |
| 2 | 0 | −5 | 13 | 40 | 21 | −4 | −1 | 0 |
| 3 | 0 | −5 | 11 | 39 | 24 | −4 | −2 | 1 |
| 4 | 0 | −5 | 9 | 38 | 26 | −3 | −2 | 1 |
| 5 | 0 | −5 | 7 | 38 | 28 | −2 | −3 | 1 |
| 6 | 1 | −5 | 5 | 36 | 30 | −1 | −3 | 1 |
| 7 | 1 | −4 | 3 | 35 | 32 | 0 | −4 | 1 |
| 8 | 1 | −4 | 2 | 33 | 33 | 2 | −4 | 1 |
| 9 | 1 | −4 | 0 | 32 | 35 | 3 | −4 | 1 |
| 10 | 1 | −3 | −1 | 30 | 36 | 5 | −5 | 1 |
| 11 | 1 | −3 | −2 | 28 | 38 | 7 | −5 | 0 |
| 12 | 1 | −2 | −3 | 26 | 38 | 9 | −5 | 0 |
| 13 | 1 | −2 | −4 | 24 | 39 | 11 | −5 | 0 |
| 14 | 0 | −1 | −4 | 21 | 40 | 13 | −5 | 0 |
| 15 | 0 | −1 | −5 | 19 | 41 | 15 | −5 | 0 |

TABLE 6

Chroma interpolation filters when the down-sampling ratio is equal to or greater than 1.5:1

| Fractional sample | interpolation filter coefficients | | | |
|---|---|---|---|---|
| | P0 | P1 | P2 | P3 |
| 0 | 12 | 40 | 12 | 0 |
| 1 | 11 | 40 | 13 | 0 |
| 2 | 10 | 40 | 15 | −1 |
| 3 | 9 | 40 | 16 | −1 |
| 4 | 8 | 40 | 17 | −1 |
| 5 | 8 | 39 | 18 | −1 |
| 6 | 7 | 39 | 19 | −1 |
| 7 | 6 | 38 | 21 | −1 |
| 8 | 5 | 38 | 22 | −1 |
| 9 | 4 | 38 | 23 | −1 |
| 10 | 4 | 37 | 24 | −1 |
| 11 | 3 | 36 | 25 | 0 |
| 12 | 3 | 35 | 26 | 0 |
| 13 | 2 | 34 | 28 | 0 |
| 14 | 2 | 33 | 29 | 0 |
| 15 | 1 | 33 | 30 | 0 |
| 16 | 1 | 31 | 31 | 1 |
| 17 | 0 | 30 | 33 | 1 |
| 18 | 0 | 29 | 33 | 2 |
| 19 | 0 | 28 | 34 | 2 |
| 20 | 0 | 26 | 35 | 3 |
| 21 | 0 | 25 | 36 | 3 |
| 22 | −1 | 24 | 37 | 4 |
| 23 | −1 | 23 | 38 | 4 |
| 24 | −1 | 22 | 38 | 5 |
| 25 | −1 | 21 | 38 | 6 |
| 26 | −1 | 19 | 39 | 7 |
| 27 | −1 | 18 | 39 | 8 |
| 28 | −1 | 17 | 40 | 8 |

TABLE 6-continued

Chroma interpolation filters when the down-sampling ratio is equal to or greater than 1.5:1

| Fractional sample | interpolation filter coefficients | | | |
|---|---|---|---|---|
| | P0 | P1 | P2 | P3 |
| 29 | −1 | 16 | 40 | 9 |
| 30 | −1 | 15 | 40 | 10 |
| 31 | 0 | 13 | 40 | 11 |

When the down-sampling ratio is equal to or greater than 2:1, the following 8-tap and 4-tap down-sampling filters that are derived by applying a cosine window function to 12-tap SHM down-sampling filters (as shown in Table 7 and Table 8) are used.

TABLE 7

Luma interpolation filters when the down-sampling ratio is equal to or greater than 2:1

| Fractional sample | interpolation filter coefficients | | | | | | | |
|---|---|---|---|---|---|---|---|---|
| | P0 | P1 | P2 | P3 | P4 | P5 | P6 | P7 |
| 0 | −4 | 2 | 20 | 28 | 20 | 2 | −4 | 0 |
| 1 | −4 | 0 | 19 | 29 | 21 | 5 | −4 | −2 |
| 2 | −4 | −1 | 18 | 29 | 22 | 6 | −4 | −2 |
| 3 | −4 | −1 | 16 | 29 | 23 | 7 | −4 | −2 |
| 4 | −4 | −1 | 16 | 28 | 24 | 7 | −4 | −2 |
| 5 | −4 | −1 | 14 | 28 | 25 | 8 | −4 | −2 |
| 6 | −3 | −3 | 14 | 27 | 26 | 9 | −3 | −3 |
| 7 | −3 | −1 | 12 | 28 | 25 | 10 | −4 | −3 |
| 8 | −3 | −3 | 11 | 27 | 27 | 11 | −3 | −3 |
| 9 | −3 | −4 | 10 | 25 | 28 | 12 | −1 | −3 |
| 10 | −3 | −3 | 9 | 26 | 27 | 14 | −3 | −3 |
| 11 | −2 | −4 | 8 | 25 | 28 | 14 | −1 | −4 |
| 12 | −2 | −4 | 7 | 24 | 28 | 16 | −1 | −4 |
| 13 | −2 | −4 | 7 | 23 | 29 | 16 | −1 | −4 |
| 14 | −2 | −4 | 6 | 22 | 29 | 18 | −1 | −4 |
| 15 | −2 | −4 | 5 | 21 | 29 | 19 | 0 | −4 |

TABLE 8

Chroma interpolation filters when the down-sampling ratio is equal to or greater than 2:1

| Fractional sample | interpolation filter coefficients | | | |
|---|---|---|---|---|
| | P0 | P1 | P2 | P3 |
| 0 | 17 | 30 | 17 | 0 |
| 1 | 17 | 30 | 18 | −1 |
| 2 | 16 | 30 | 18 | 0 |
| 3 | 16 | 30 | 18 | 0 |
| 4 | 15 | 30 | 18 | 1 |
| 5 | 14 | 30 | 18 | 2 |
| 6 | 13 | 29 | 19 | 3 |
| 7 | 13 | 29 | 19 | 3 |
| 8 | 12 | 29 | 20 | 3 |
| 9 | 11 | 28 | 21 | 4 |
| 10 | 10 | 28 | 22 | 4 |
| 11 | 10 | 27 | 22 | 5 |
| 12 | 9 | 27 | 23 | 5 |
| 13 | 9 | 26 | 24 | 5 |
| 14 | 8 | 26 | 24 | 6 |
| 15 | 7 | 26 | 25 | 6 |
| 16 | 7 | 25 | 25 | 7 |
| 17 | 6 | 25 | 26 | 7 |
| 18 | 6 | 24 | 26 | 8 |
| 19 | 5 | 24 | 26 | 9 |
| 20 | 5 | 23 | 27 | 9 |
| 21 | 5 | 22 | 27 | 10 |
| 22 | 4 | 22 | 28 | 10 |

TABLE 8-continued

Chroma interpolation filters when the down-sampling ratio is equal to or greater than 2:1

| Fractional sample | interpolation filter coefficients | | | |
|---|---|---|---|---|
| | P0 | P1 | P2 | P3 |
| 23 | 4 | 21 | 28 | 11 |
| 24 | 3 | 20 | 29 | 12 |
| 25 | 3 | 19 | 29 | 13 |
| 26 | 3 | 19 | 29 | 13 |
| 27 | 2 | 18 | 30 | 14 |
| 28 | 1 | 18 | 30 | 15 |
| 29 | 0 | 18 | 30 | 16 |
| 30 | 0 | 18 | 30 | 16 |
| 31 | −1 | 18 | 30 | 17 |

At last, the above down-sampling filters are only applied to generate the luma and chroma prediction samples of non-affine inter blocks. For affine mode, the default 8-tap and 4-tap motion interpolation filters are still applied for down-sampling.

Issues in the Existing RPR Design

The goals of this disclosure are to improve the coding efficiency of affine mode when the RPR is applied. Specifically, the following issues in the existing RPR design in the VVC are identified:

First, as discussed earlier, when the resolution of the reference picture is higher than that of the current picture, additional down-sampling filters are only applied to the motion compensation of non-affine modes. For affine mode, the 6-tap and 4-tap motion interpolation filters are applied. Given that those filters are derived from the default motion interpolation filters, they do not show strong low-pass characteristics. Therefore, compared to non-affine mode, the prediction samples of affine mode will present more serious aliasing artifacts due to the famous Nyquist-Shannon sampling theorem. Thus, to achieve better coding performance, it is desirable to also apply appropriate low-pass filters for the motion compensation of affine mode when down-sampling is needed.

Second, based on the existing RPR design, the fractional pixel position of the reference sample is determined based on the position of the current sample, the MV, and the resolution scaling ratio between the reference picture and the current picture. Correspondingly, when the down-sampling of the reference block is applied, this results in a higher memory bandwidth consumption and computational complexity to interpolate the reference samples of the current block. Assuming the current block is in the size M (width)×N (height). When the reference picture is in the same size as that of the current picture, the integer samples in the size of (M+7)×(N+7) need to be accessed in the reference picture and 8×(M×(N+7))+8×M×N multiplications are required for the motion compensation of the current block. If the down-sampling scaling ratio is s, the corresponding memory bandwidth and multiplications are increased to (s×M+7)×(s×N+7) and 8×(M×(s×N+7))+8×M×N. Table 9 and Table 10 compare the number of integer samples and the number of multiplications per sample that are used for the motion compensation of various block sizes when the RPR down-sampling scaling ratio is 1.5× and 2×, respectively. In Table 9 and Table 10, the columns under the name "RPR 1×" corresponds to the case when the resolutions of the reference picture and the current picture are the same, i.e., the RPR is not applied. The column "ratio to RPR 1×" depicts the corresponding ratio of memory bandwidth/ multiplication with an RPR down-sampling ratio larger than 1 to the corresponding worst-case number (i.e., 16×4 bi-prediction) under regular inter mode without the RPR. As can be seen, compared to the worst-case complexity of regular inter prediction, there are significant increases for memory bandwidth and computational complexity when the reference picture has a higher resolution than the current picture. The peak increase comes from 16×4 bi-prediction, where the memory bandwidth and the numbers of multiplications are 231% and 127% of that of worst-case bi-prediction.

TABLE 9

Per-sample memory bandwidth consumption when RPR ratio is 1.5X and 2X

| Width | Height | RPR 1X Memory bandwidth | RPR 1.5X Memory bandwidth | ratio to RPR 1X | RPR 2X Memory bandwidth | ratio to RPR 1X |
|---|---|---|---|---|---|---|
| 4 | 8 | 5.16 | 7.72 | 98% | 10.78 | 136% |
| 8 | 4 | 5.16 | 7.72 | 98% | 10.78 | 136% |
| 4 | 16 | 7.91 | 12.59 | 159% | 18.28 | 231% |
| 16 | 4 | 7.91 | 12.59 | 159% | 18.28 | 231% |
| 4 | 32 | 6.70 | 11.17 | 141% | 16.64 | 210% |
| 32 | 4 | 6.70 | 11.17 | 141% | 16.64 | 210% |
| 4 | 64 | 6.10 | 10.46 | 132% | 15.82 | 200% |
| 64 | 4 | 6.10 | 10.46 | 132% | 15.82 | 200% |
| 4 | 128 | 5.80 | 10.11 | 128% | 15.41 | 195% |
| 128 | 4 | 5.80 | 10.11 | 128% | 15.41 | 195% |
| 8 | 8 | 7.03 | 11.28 | 143% | 16.53 | 209% |
| 8 | 16 | 5.39 | 9.20 | 116% | 14.02 | 177% |
| 16 | 8 | 5.39 | 9.20 | 116% | 14.02 | 177% |
| 8 | 32 | 4.57 | 8.16 | 103% | 12.76 | 161% |
| 32 | 8 | 4.57 | 8.16 | 103% | 12.76 | 161% |
| 8 | 64 | 4.16 | 7.64 | 97% | 12.13 | 153% |
| 64 | 8 | 4.16 | 7.64 | 97% | 12.13 | 153% |
| 8 | 128 | 3.96 | 7.38 | 93% | 11.81 | 149% |
| 128 | 8 | 3.96 | 7.38 | 93% | 11.81 | 149% |
| 16 | 16 | 4.13 | 7.51 | 95% | 11.88 | 150% |
| 16 | 32 | 3.50 | 6.66 | 84% | 10.82 | 137% |
| 32 | 16 | 3.50 | 6.66 | 84% | 10.82 | 137% |
| 16 | 64 | 3.19 | 6.24 | 79% | 10.28 | 130% |
| 64 | 16 | 3.19 | 6.24 | 79% | 10.28 | 130% |
| 16 | 128 | 3.03 | 6.02 | 76% | 10.02 | 127% |
| 128 | 16 | 3.03 | 6.02 | 76% | 10.02 | 127% |
| 32 | 32 | 2.97 | 5.91 | 75% | 9.85 | 125% |
| 32 | 128 | 2.57 | 5.34 | 68% | 9.12 | 115% |
| 128 | 32 | 2.57 | 5.34 | 68% | 9.12 | 115% |
| 64 | 64 | 2.46 | 5.18 | 66% | 8.90 | 113% |
| 64 | 128 | 2.34 | 5.00 | 63% | 8.67 | 110% |
| 128 | 64 | 2.34 | 5.00 | 63% | 8.67 | 110% |
| 128 | 128 | 2.22 | 4.83 | 61% | 8.44 | 107% |

TABLE 10

Per-sample number of multiplications when RPR ratio is 1.5X and 2X

| Width | Height | RPR 1X Mul | RPR 1.5X Mul | ratio to RPR 1X | RPR 2X Mul | ratio to RPR 1X |
|---|---|---|---|---|---|---|
| 4 | 8 | 23.00 | 27.00 | 45% | 31.00 | 52% |
| 8 | 4 | 30.00 | 34.00 | 57% | 38.00 | 63% |
| 4 | 16 | 39.00 | 47.00 | 78% | 55.00 | 92% |
| 16 | 4 | 60.00 | 68.00 | 113% | 76.00 | 127% |
| 4 | 32 | 35.50 | 43.50 | 73% | 51.50 | 86% |
| 32 | 4 | 60.00 | 68.00 | 113% | 76.00 | 127% |
| 4 | 64 | 33.75 | 41.75 | 70% | 49.75 | 83% |
| 64 | 4 | 60.00 | 68.00 | 113% | 76.00 | 127% |
| 4 | 128 | 32.88 | 40.88 | 68% | 48.88 | 81% |
| 128 | 4 | 60.00 | 68.00 | 113% | 76.00 | 127% |
| 8 | 8 | 46.00 | 54.00 | 90% | 62.00 | 103% |
| 8 | 16 | 39.00 | 47.00 | 78% | 55.00 | 92% |
| 16 | 8 | 46.00 | 54.00 | 90% | 62.00 | 103% |
| 8 | 32 | 35.50 | 43.50 | 73% | 51.50 | 86% |
| 32 | 8 | 46.00 | 54.00 | 90% | 62.00 | 103% |
| 8 | 64 | 33.75 | 41.75 | 70% | 49.75 | 83% |
| 64 | 8 | 46.00 | 54.00 | 90% | 62.00 | 103% |
| 8 | 128 | 32.88 | 40.88 | 68% | 48.88 | 81% |
| 128 | 8 | 46.00 | 54.00 | 90% | 62.00 | 103% |
| 16 | 16 | 39.00 | 47.00 | 78% | 55.00 | 92% |
| 16 | 32 | 35.50 | 43.50 | 73% | 51.50 | 86% |
| 32 | 16 | 39.00 | 47.00 | 78% | 55.00 | 92% |
| 16 | 64 | 33.75 | 41.75 | 70% | 49.75 | 83% |
| 64 | 16 | 39.00 | 47.00 | 78% | 55.00 | 92% |
| 16 | 128 | 32.88 | 40.88 | 68% | 48.88 | 81% |
| 128 | 16 | 39.00 | 47.00 | 78% | 55.00 | 92% |
| 32 | 32 | 35.50 | 43.50 | 73% | 51.50 | 86% |
| 32 | 128 | 32.88 | 40.88 | 68% | 48.88 | 81% |
| 128 | 32 | 35.50 | 43.50 | 73% | 51.50 | 86% |
| 64 | 64 | 33.75 | 41.75 | 70% | 49.75 | 83% |
| 64 | 128 | 32.88 | 40.88 | 68% | 48.88 | 81% |
| 128 | 64 | 33.75 | 41.75 | 70% | 49.75 | 83% |
| 128 | 128 | 32.88 | 40.88 | 68% | 48.88 | 81% |

Third, in the existing RPR design, the VVC only supports the adaptive switch of the resolutions of pictures within one same bitstream while the bit-depth used for coding the video sequence remains the same. However, according to "requirements for a Future Video Coding Standard" for issuing the CfP of the VVC standard, it is clearly stated "the standard shall support fast representation switching in the case of adaptive streaming services that offer multiple representations of the same content, each having different properties (e.g., spatial resolution or sample bit depth)." In practical video applications, allowing changing the coding bit-depth within a coded video sequence can offer more flexible performance/complexity tradeoffs to video encoders/decoders, especially to software codec implementations due to single-instruction-multiple-data (SIMD) operations.

Improvements to RPR Coding

In this disclosure, solutions are proposed to improve the efficiency and reduce the memory bandwidth and computational complexity of the RPR coding in the VVC. More specifically, the technologies proposed in this disclosure can be summarized as follows:

First, to improve the RPR coding efficiency of the affine mode, new low-pass interpolation filters are proposed to replace the existing 8-tap luma and 4-tap chroma interpolation filters that are used for the affine when the reference picture is in higher resolution than the current picture, i.e., when down-sampling is needed.

Second, for the simplification of the RPR, it is proposed to disable the RPR-based inter prediction for certain CU sizes that lead to significant memory bandwidth and computational complexity increases compared to that of the regular inter mode without the RPR being applied.

Third, one approach is proposed to allow dynamic changes of internal bit-depth used for coding one video sequence.

Down-Sampling Filters for Affine Mode

As mentioned above, the default 6-tap and 4-tap motion interpolation filters are always applied to affine mode no matter whether the resolutions of the current picture and its reference picture are the same or not. Same as the interpolation filters used in the HEVC, the default motion interpolation filters in the VVC do not present strong low-pass characteristics. When the spatial scaling ratio is close to 1, the default motion interpolation filter can provide an acceptable quality of prediction samples. However, when the resolution down-sampling ratio from the reference picture to the current picture becomes larger, based on the Nyquist-Shannon sampling theorem, aliasing artifacts will become much more severe if the same default motion interpolation filter is used. Especially when the applied MV points to reference samples at integer sample positions, the default motion interpolation applies no filter operations at all. This could result in a significant quality drop of the prediction samples for the affine blocks.

In order to mitigate the aliasing artifacts resulted from the down-sampling, according to the current disclosure, it is proposed to use different interpolation filters with stronger low-pass characteristics to replace the existing default 6-tap/4-tap interpolation filters for the motion compensation of the affine mode. Additionally, in order to maintain the memory bandwidth and computational complexity the same as the regular motion compensation process, the proposed down-sampling filters are in the same length as the existing interpolation filters used for the affine mode, i.e., 6-tap for luma component and 4-tap for chroma component.

Figure 7:
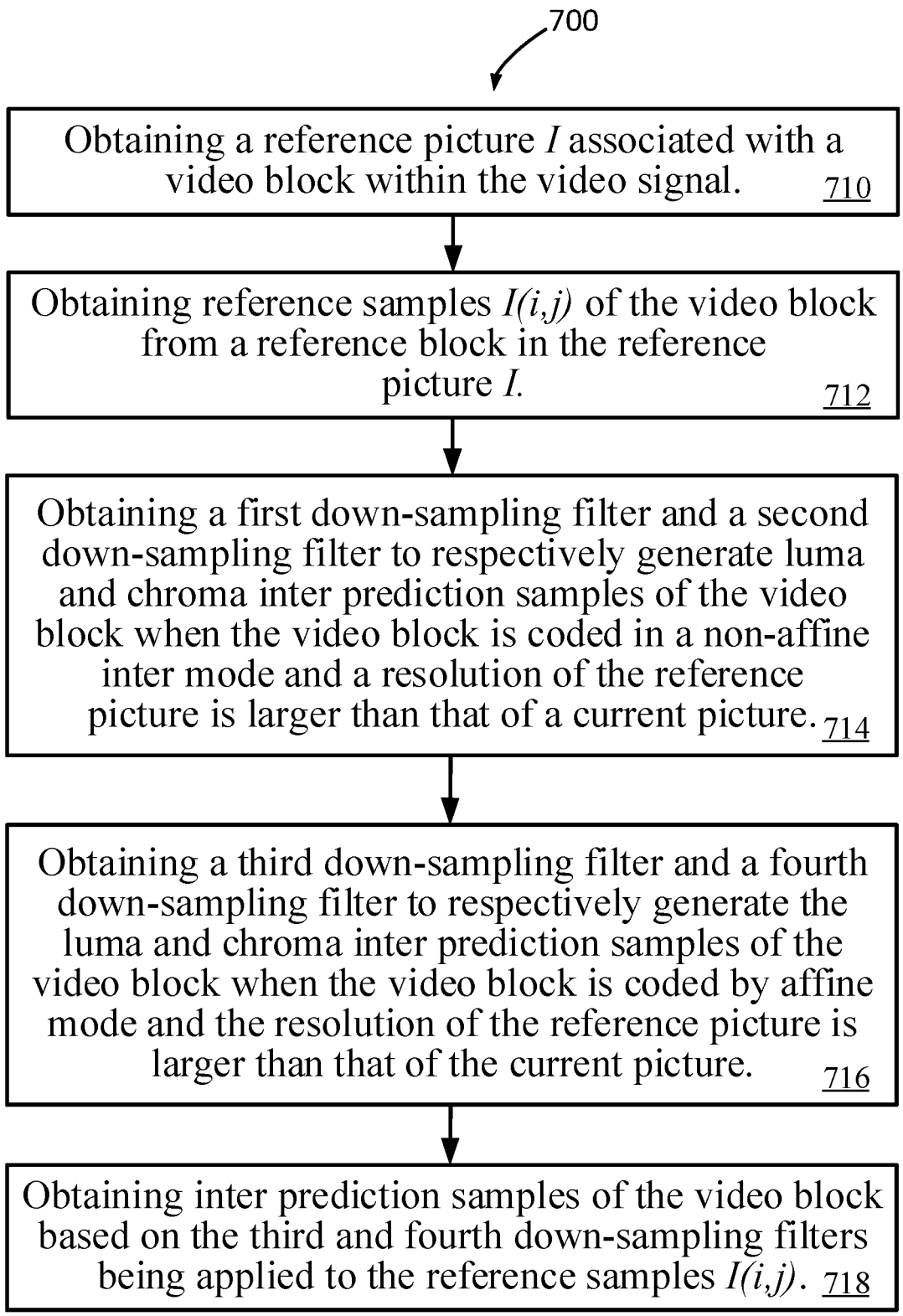
FIG. 7 is a method for decoding a video signal, according to an example of the present disclosure.

FIG. 7 shows a method for decoding a video signal. The method may be, for example, applied to a decoder.

In step 710, the decoder may obtain a reference picture I associated with a video block within the video signal.

In step 712, the decoder may obtain reference samples I(i,j) of the video block from a reference block in the reference picture I. The i and j, for example, may represent a coordinate of one sample within the video block.

In step 714, the decoder may obtain a first down-sampling filter and a second down-sampling filter to respectively generate luma and chroma inter prediction samples of the video block when the video block is coded in a non-affine inter mode and a resolution of the reference picture I is larger than that of a current picture.

In step 716, the decoder may obtain a third down-sampling filter and a fourth down-sampling filter to respectively generate the luma and chroma inter prediction samples of the video block when the video block is coded by affine mode and the resolution of the reference picture is larger than that of the current picture.

In step 718, the decoder may obtain inter prediction samples of the video block based on the third and fourth down-sampling filters being applied to the reference samples I(i,j).

Affine Luma Down-Sampling Filters

There may be multiple ways to derive luma down-sampling filters for the affine mode.

Method 1: In one or more embodiments of the disclosure, it is proposed to directly derive the luma down-sampling filters of affine mode from the existing luma down-sampling filters of regular inter modes (i.e., non-affine mode). Specifically, by this method, the new 6-tap luma down-sampling filters are derived from the 8-tap luma down-sampling filters in Table 5 (for scaling ratio 1.5×) and Table 7 (for scaling ratio 2×) by adding two left-most/right-most filter coefficients of the 8-tap filter into one single filter coefficient, respectively, for the 6-tap filter. Table 11 and Table 12 illustrate the proposed 6-tap luma down-sampling filters when the spatial scaling ratio is 1.5:1 and 2:1, respectively.

TABLE 11

6-tap luma down-sampling filters, scaling ratio is equal to or greater than 1.5:1

| Fractional sample | interpolation filter coefficients | | | | | |
|---|---|---|---|---|---|---|
| | P0 | P1 | P2 | P3 | P4 | P5 |
| 0 | −4 | 17 | 42 | 17 | −5 | −1 |
| 1 | −5 | 15 | 41 | 19 | −5 | −1 |
| 2 | −5 | 13 | 40 | 21 | −4 | −1 |
| 3 | −5 | 11 | 39 | 24 | −4 | −1 |
| 4 | −5 | 9 | 38 | 26 | −3 | −1 |
| 5 | −5 | 7 | 38 | 28 | −2 | −1 |
| 6 | −4 | 5 | 36 | 30 | −1 | −2 |
| 7 | −3 | 3 | 35 | 32 | 0 | −3 |
| 8 | −3 | 2 | 33 | 33 | 2 | −3 |
| 9 | −3 | 0 | 32 | 35 | 3 | −3 |
| 10 | −2 | −1 | 30 | 36 | 5 | −4 |
| 11 | −2 | −2 | 28 | 38 | 7 | −5 |
| 12 | −1 | −3 | 26 | 38 | 9 | −5 |
| 13 | −1 | −4 | 24 | 39 | 11 | −5 |
| 14 | −1 | −4 | 21 | 40 | 13 | −5 |
| 15 | −1 | −5 | 19 | 41 | 15 | −5 |

TABLE 12

6-tap luma down-sampling filters when scaling ratio is equal to or greater than 2:1

| Fractional sample | interpolation filter coefficients | | | | | |
|---|---|---|---|---|---|---|
| | P0 | P1 | P2 | P3 | P4 | P5 |
| 0 | −2 | 20 | 28 | 20 | 2 | −4 |
| 1 | −4 | 19 | 29 | 21 | 5 | −6 |
| 2 | −5 | 18 | 29 | 22 | 6 | −6 |
| 3 | −5 | 16 | 29 | 23 | 7 | −6 |
| 4 | −5 | 16 | 28 | 24 | 7 | −6 |
| 5 | −5 | 14 | 28 | 25 | 8 | −6 |
| 6 | −6 | 14 | 27 | 26 | 9 | −6 |
| 7 | −4 | 12 | 28 | 25 | 10 | −7 |
| 8 | −6 | 11 | 27 | 27 | 11 | −6 |
| 9 | −7 | 10 | 25 | 28 | 12 | −4 |
| 10 | −6 | 9 | 26 | 27 | 14 | −6 |
| 11 | −6 | 8 | 25 | 28 | 14 | −5 |
| 12 | −6 | 7 | 24 | 28 | 16 | −5 |
| 13 | −6 | 7 | 23 | 29 | 16 | −5 |
| 14 | −6 | 6 | 22 | 29 | 18 | −5 |
| 15 | −6 | 5 | 21 | 29 | 19 | −4 |

Method 2: In one or more embodiments of the disclosure, it is proposed to directly derive the 6-tap affine down-sampling filters from the SHM filters, which are derived based on cosine windowed sinc function. Specifically, in this method, the affine down-sampling filter is derived based on the following equation:

$$Filt_{aff}(n) = h(n) \cdot w(n), \quad n = -\frac{L-1}{2}, \ldots, \frac{L-1}{2} \quad (3)$$

where L is filter length and h(n) is the frequency response of idea low-pass, which is calculated as:

$$h(n) = s \cdot f_c \cdot \text{sinc}(s \cdot f_c \cdot n), \quad n = -\infty, \ldots, +\infty \quad (4)$$

$f_c$ is a cut-off frequency and s is scaling ratio. w(n) is a cosine window function, which defined as:

$$w(n) = \cos\left(\frac{\pi \cdot n}{L-1}\right), \quad n = -\frac{L-1}{2}, \ldots, \frac{L-1}{2} \quad (5)$$

In one example, assuming f is 0.9 and L=6, Table 13 and Table 14 illustrates the derived 6-tap luma down-sampling when the spatial scaling ratio is 1.5× (i.e., s=1.5) and 2× (s=2).

TABLE 13

6-tap luma down-sampling filters, scaling ratio is equal to or greater than 1.5:1

| Fractional sample | Filter coefficients | | | | | |
|---|---|---|---|---|---|---|
| | p0 | p1 | p2 | p3 | p4 | p5 |
| 0 | −5 | 18 | 38 | 18 | −5 | 0 |
| 1 | −5 | 16 | 39 | 20 | −4 | −2 |
| 2 | −5 | 14 | 39 | 22 | −4 | −2 |
| 3 | −5 | 13 | 38 | 24 | −3 | −3 |
| 4 | −5 | 11 | 37 | 26 | −2 | −3 |
| 5 | −5 | 9 | 36 | 28 | −1 | −3 |
| 6 | −5 | 8 | 35 | 30 | −1 | −3 |
| 7 | −4 | 6 | 34 | 31 | 1 | −4 |
| 8 | −4 | 3 | 33 | 33 | 3 | −4 |
| 9 | −4 | 1 | 31 | 34 | 6 | −4 |
| 10 | −3 | −1 | 30 | 35 | 8 | −5 |
| 11 | −3 | −1 | 28 | 36 | 9 | −5 |
| 12 | −3 | −2 | 26 | 37 | 11 | −5 |
| 13 | −3 | −3 | 24 | 38 | 13 | −5 |
| 14 | −2 | −4 | 22 | 39 | 14 | −5 |
| 15 | −2 | −4 | 20 | 39 | 16 | −5 |

TABLE 14

6-tap luma down-sampling filters when scaling ratio is equal to or greater than 2:1

| Fractional sample position p | Filter coefficients | | | | | |
|---|---|---|---|---|---|---|
| | p0 | p1 | p2 | p3 | p4 | p5 |
| 0 | 0 | 19 | 26 | 19 | 0 | 0 |
| 1 | −1 | 18 | 27 | 20 | 2 | −2 |
| 2 | −1 | 16 | 27 | 21 | 3 | −2 |
| 3 | −2 | 15 | 27 | 22 | 5 | −3 |
| 4 | −2 | 14 | 26 | 23 | 6 | −3 |
| 5 | −2 | 13 | 26 | 24 | 6 | −3 |
| 6 | −3 | 12 | 25 | 25 | 8 | −3 |
| 7 | −3 | 11 | 25 | 25 | 9 | −3 |
| 8 | −3 | 10 | 25 | 25 | 10 | −3 |
| 9 | −3 | 9 | 25 | 25 | 11 | −3 |
| 10 | −3 | 8 | 25 | 25 | 12 | −3 |
| 11 | −3 | 6 | 24 | 26 | 13 | −2 |
| 12 | −3 | 6 | 23 | 26 | 14 | −2 |
| 13 | −3 | 5 | 22 | 27 | 15 | −2 |
| 14 | −2 | 3 | 21 | 27 | 16 | −1 |
| 15 | −2 | 2 | 20 | 27 | 18 | −1 |

Note that in Table 13 and Table 14, the filter coefficients are derived in the precision of the 7-bit sign variable, which is kept the same as the down-sampling filters used in the RPR design.

Figure 8:
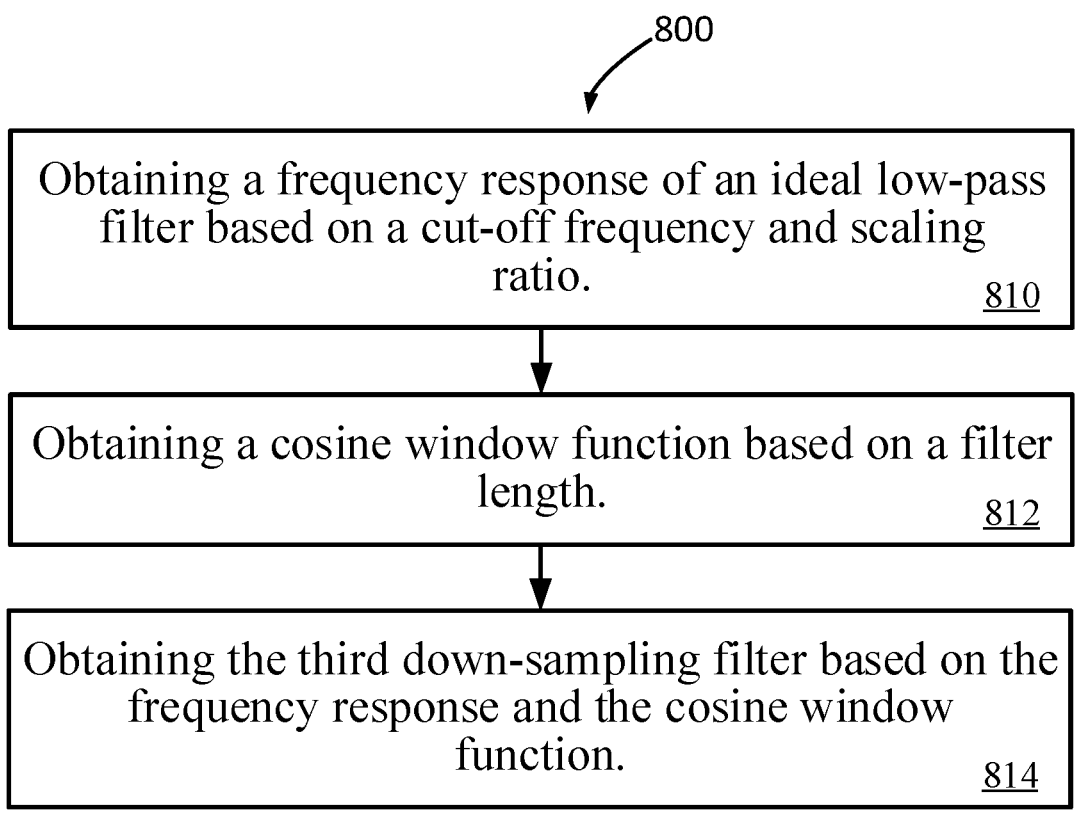
FIG. 8 is a method for decoding a video signal, according to an example of the present disclosure

FIG. 8 shows a method for decoding a video signal. The method may be, for example, applied to a decoder.

In step 810, the decoder may obtain a frequency response of an ideal low-pass filter based on a cut-off frequency and scaling ratio.

In step 812, the decoder may obtain a cosine window function based on a filter length.

In step 814, the decoder may obtain the third down-sampling filter based on the frequency response and the cosine window function.

Affine Chroma Down-Sampling Filters

In the following, three methods are proposed to down-sample a chroma reference block when the resolution of the reference picture is higher than that of the current picture.

Method 1: In the first method, it is proposed to reuse the existing 4-tap chroma down-sampling filters for 1.5× (Table 6) and 2× (Table 8) designed for non-affine mode under RPR for the down-sampling of the reference samples for the affine mode.

Method 2: In the second method, it is proposed to reuse the default 4-tap chroma interpolation filters (Table 3) to down-sample the reference samples of the affine mode.

Method 3: In the third method, it is proposed to derive chroma down-sampling filters based on the cosine windowed sinc function, as depicted in (3) to (5). Table 15 and Table 16 depict the derived 4-tap chroma down-sampling filters for the scaling ratios of 1.5× and 2×, respectively, when assuming the cut-off frequency of the cosine window sinc function is 0.9.

TABLE 15

4-tap chroma down-sampling filters, scaling ratio is equal to or greater than 1.5:1

| Fractional sample position p | Filter coefficients | | | |
|---|---|---|---|---|
| | p0 | p1 | p2 | p3 |
| 0 | 13 | 38 | 13 | 0 |
| 1 | 13 | 38 | 14 | −1 |
| 2 | 12 | 38 | 15 | −1 |
| 3 | 11 | 37 | 17 | −1 |
| 4 | 10 | 38 | 18 | −2 |
| 5 | 9 | 38 | 19 | −2 |
| 6 | 8 | 38 | 20 | −2 |
| 7 | 7 | 38 | 21 | −2 |
| 8 | 6 | 37 | 22 | −1 |
| 9 | 6 | 36 | 24 | −2 |
| 10 | 5 | 36 | 25 | −2 |
| 11 | 4 | 35 | 26 | −1 |
| 12 | 4 | 34 | 27 | −1 |
| 13 | 3 | 34 | 28 | −1 |
| 14 | 3 | 33 | 29 | −1 |
| 15 | 2 | 32 | 30 | 0 |
| 16 | 1 | 31 | 31 | 1 |
| 17 | 0 | 30 | 32 | 2 |
| 18 | −1 | 29 | 33 | 3 |
| 19 | −1 | 28 | 34 | 3 |
| 20 | −1 | 27 | 34 | 4 |
| 21 | −1 | 26 | 35 | 4 |
| 22 | −2 | 25 | 36 | 5 |
| 23 | −2 | 24 | 36 | 6 |
| 24 | −1 | 22 | 37 | 6 |
| 25 | −2 | 21 | 38 | 7 |
| 26 | −2 | 20 | 38 | 8 |
| 27 | −2 | 19 | 38 | 9 |
| 28 | −2 | 18 | 38 | 10 |
| 29 | −1 | 17 | 37 | 11 |
| 30 | −1 | 15 | 38 | 12 |
| 31 | −1 | 14 | 38 | 13 |

TABLE 16

4-tap chroma down-sampling filters, scaling ratio is equal to or greater than 2:1

| Fractional sample position p | Filter coefficients | | | |
|---|---|---|---|---|
| | p0 | p1 | p2 | p3 |
| 0 | 17 | 30 | 17 | 0 |
| 1 | 17 | 30 | 18 | −1 |
| 2 | 16 | 30 | 18 | 0 |
| 3 | 16 | 30 | 18 | 0 |
| 4 | 15 | 30 | 18 | 1 |
| 5 | 14 | 30 | 18 | 2 |
| 6 | 13 | 29 | 19 | 3 |

TABLE 16-continued 4-tap chroma down-sampling filters, scaling
ratio is equal to or greater than 2:1

| Fractional sample position p | Filter coefficients | | | |
|---|---|---|---|---|
| | p0 | p1 | p2 | p3 |
| 7 | 13 | 29 | 19 | 3 |
| 8 | 12 | 29 | 20 | 3 |
| 9 | 11 | 28 | 21 | 4 |
| 10 | 10 | 28 | 22 | 4 |
| 11 | 10 | 27 | 22 | 5 |
| 12 | 9 | 27 | 23 | 5 |
| 13 | 9 | 26 | 24 | 5 |
| 14 | 8 | 26 | 24 | 6 |
| 15 | 7 | 26 | 25 | 6 |
| 16 | 7 | 25 | 25 | 7 |
| 17 | 6 | 25 | 26 | 7 |
| 18 | 6 | 24 | 26 | 8 |
| 19 | 5 | 24 | 26 | 9 |
| 20 | 5 | 23 | 27 | 9 |
| 21 | 5 | 22 | 27 | 10 |
| 22 | 4 | 22 | 28 | 10 |
| 23 | 4 | 21 | 28 | 11 |
| 24 | 3 | 20 | 29 | 12 |
| 25 | 3 | 19 | 29 | 13 |
| 26 | 3 | 19 | 29 | 13 |
| 27 | 2 | 18 | 30 | 14 |
| 28 | 1 | 18 | 30 | 15 |
| 29 | 0 | 18 | 30 | 16 |
| 30 | 0 | 18 | 30 | 16 |
| 31 | −1 | 18 | 30 | 17 |

Constrained Block-Size for the RPR Mode

As analyzed in the section "problem statement", when down-sampling happens, the existing RPR brings significant complexity increase (e.g., the number of integer samples accessed for motion compensation and the number of multiplications needed). Specifically, the memory bandwidth and the numbers of multiplications when the reference block needs to be down-sampled are 231% and 127% of that of worst-case bi-prediction.

In one or more embodiments, it is proposed to disable the bi-prediction (but still allow uni-prediction) during inter prediction for certain block shapes, e.g., 4×N, N×4 and/or 8×8, when the resolution of the reference picture is higher than that of the current picture. Table 17 and Table 18 show the corresponding per-sample memory bandwidth and the number of multiplications when bi-prediction is disabled for 4×N, N×4 and 8×8 block size during the inter prediction with RPR. As can be seen, with the proposed constraint, the memory bandwidth and the numbers of multiplications are reduced to 1300 and 107 of that of worst-case bi-prediction for 1.4× down-sampling, and 116% and 113% for 2× down-sampling.

TABLE 17

Per-sample memory bandwidth consumption after
block size constraint is applied for the RPR,
for the down-sampling ratios of 1.5X and 2X

| | | RPR 1X | RPR 1.5X | | RPR 2X | |
|---|---|---|---|---|---|---|
| Width | Height | Memory bandwidth | Memory bandwidth | ratio to RPR 1X | Memory bandwidth | ratio to RPR 1X |
| 4 | 8 | 5.16 | 7.72 | 98% | 10.78 | 136% |
| 8 | 4 | 5.16 | 7.72 | 98% | 10.78 | 136% |
| 4 | 16 | 7.91 | 10.25 | 130% | 13.09 | 166% |
| 16 | 4 | 7.91 | 10.25 | 130% | 13.09 | 166% |
| 4 | 32 | 6.70 | 8.94 | 113% | 11.67 | 148% |

TABLE 17-continued

Per-sample memory bandwidth consumption after
block size constraint is applied for the RPR,
for the down-sampling ratios of 1.5X and 2X

| | | RPR 1X | RPR 1.5X | | RPR 2X | |
|---|---|---|---|---|---|---|
| Width | Height | Memory bandwidth | Memory bandwidth | ratio to RPR 1X | Memory bandwidth | ratio to RPR 1X |
| 32 | 4 | 6.70 | 8.94 | 113% | 11.67 | 148% |
| 4 | 64 | 6.10 | 8.28 | 105% | 10.96 | 139% |
| 64 | 4 | 6.10 | 8.28 | 105% | 10.96 | 139% |
| 4 | 128 | 5.80 | 7.95 | 101% | 10.61 | 134% |
| 128 | 4 | 5.80 | 7.95 | 101% | 10.61 | 134% |
| 8 | 8 | 7.03 | 9.16 | 116% | 11.78 | 149% |
| 8 | 16 | 5.39 | 9.20 | 116% | 14.02 | 177% |
| 16 | 8 | 5.39 | 9.20 | 116% | 14.02 | 177% |
| 8 | 32 | 4.57 | 8.16 | 103% | 12.76 | 161% |
| 32 | 8 | 4.57 | 8.16 | 103% | 12.76 | 161% |
| 8 | 64 | 4.16 | 7.64 | 97% | 12.13 | 153% |
| 64 | 8 | 4.16 | 7.64 | 97% | 12.13 | 153% |
| 8 | 128 | 3.96 | 7.38 | 93% | 11.81 | 149% |
| 128 | 8 | 3.96 | 7.38 | 93% | 11.81 | 149% |
| 16 | 16 | 4.13 | 7.51 | 95% | 11.88 | 150% |
| 16 | 32 | 3.50 | 6.66 | 84% | 10.82 | 137% |
| 32 | 16 | 3.50 | 6.66 | 84% | 10.82 | 137% |
| 16 | 64 | 3.19 | 6.24 | 79% | 10.28 | 130% |
| 64 | 16 | 3.19 | 6.24 | 79% | 10.28 | 130% |
| 16 | 128 | 3.03 | 6.02 | 76% | 10.02 | 127% |
| 128 | 16 | 3.03 | 6.02 | 76% | 10.02 | 127% |
| 32 | 32 | 2.97 | 5.91 | 75% | 9.85 | 125% |
| 32 | 128 | 2.57 | 5.34 | 68% | 9.12 | 115% |
| 128 | 32 | 2.57 | 5.34 | 68% | 9.12 | 115% |
| 64 | 64 | 2.46 | 5.18 | 66% | 8.90 | 113% |
| 64 | 128 | 2.34 | 5.00 | 63% | 8.67 | 110% |
| 128 | 64 | 2.34 | 5.00 | 63% | 8.67 | 110% |
| 128 | 128 | 2.22 | 4.83 | 61% | 8.44 | 107% |

TABLE 18

Per-sample number of multiplications when the
block size constraint is applied to the RPR,
for the down-sampling ratios of 1.5X and 2X

| | | RPR 1X | RPR 1.5X | | RPR 2X | |
|---|---|---|---|---|---|---|
| Width | Height | Mul | Mul | ratio to RPR 1X | Mul | ratio to RPR 1X |
| 4 | 8 | 23.00 | 27.00 | 45% | 31.00 | 52% |
| 8 | 4 | 30.00 | 34.00 | 57% | 38.00 | 63% |
| 4 | 16 | 39.00 | 43.00 | 72% | 47.00 | 78% |
| 16 | 4 | 60.00 | 64.00 | 107% | 68.00 | 113% |
| 4 | 32 | 35.50 | 39.50 | 66% | 43.50 | 73% |
| 32 | 4 | 60.00 | 64.00 | 107% | 68.00 | 113% |
| 4 | 64 | 33.75 | 37.75 | 63% | 41.75 | 70% |
| 64 | 4 | 60.00 | 64.00 | 107% | 68.00 | 113% |
| 4 | 128 | 32.88 | 36.88 | 61% | 40.88 | 68% |
| 128 | 4 | 60.00 | 64.00 | 107% | 68.00 | 113% |
| 8 | 8 | 46.00 | 50.00 | 83% | 54.00 | 90% |
| 8 | 16 | 39.00 | 47.00 | 78% | 55.00 | 92% |
| 16 | 8 | 46.00 | 54.00 | 90% | 62.00 | 103% |
| 8 | 32 | 35.50 | 43.50 | 73% | 51.50 | 86% |
| 32 | 8 | 46.00 | 54.00 | 90% | 62.00 | 103% |
| 8 | 64 | 33.75 | 41.75 | 70% | 49.75 | 83% |
| 64 | 8 | 46.00 | 54.00 | 90% | 62.00 | 103% |
| 8 | 128 | 32.88 | 40.88 | 68% | 48.88 | 81% |
| 128 | 8 | 46.00 | 54.00 | 90% | 62.00 | 103% |
| 16 | 16 | 39.00 | 47.00 | 78% | 55.00 | 92% |
| 16 | 32 | 35.50 | 43.50 | 73% | 51.50 | 86% |
| 32 | 16 | 39.00 | 47.00 | 78% | 55.00 | 92% |
| 16 | 64 | 33.75 | 41.75 | 70% | 49.75 | 83% |
| 64 | 16 | 39.00 | 47.00 | 78% | 55.00 | 92% |
| 16 | 128 | 32.88 | 40.88 | 68% | 48.88 | 81% |
| 128 | 16 | 39.00 | 47.00 | 78% | 55.00 | 92% |
| 32 | 32 | 35.50 | 43.50 | 73% | 51.50 | 86% |
| 32 | 128 | 32.88 | 40.88 | 68% | 48.88 | 81% |

TABLE 18-continued

Per-sample number of multiplications when the
block size constraint is applied to the RPR,
for the down-sampling ratios of 1.5X and 2X

| Width | Height | RPR 1X Mul | RPR 1.5X Mul | ratio to RPR 1X | RPR 2X Mul | ratio to RPR 1X |
|---|---|---|---|---|---|---|
| 128 | 32 | 35.50 | 43.50 | 73% | 51.50 | 86% |
| 64 | 64 | 33.75 | 41.75 | 70% | 49.75 | 83% |
| 64 | 128 | 32.88 | 40.88 | 68% | 48.88 | 81% |
| 128 | 64 | 33.75 | 41.75 | 70% | 49.75 | 83% |
| 128 | 128 | 32.88 | 40.88 | 68% | 48.88 | 81% |

Although in the above example, the RPR mode bi-prediction is only disabled for 4×N, N×4 and 8×8 block sizes, to skilled persons in state-of-the-art of modern video technologies, the proposed constraint is also applicable to other block sizes and inter coding modes (e.g., uni-/bi-prediction, merge/non-merge mode and so forth).

Adaptive Bit-Depth Switch

In the existing RPR design, the VVC only supports adaptive switch of the resolutions of pictures within one same bitstream while the bit-depth used for coding the video sequence remains the same. However, as analyzed earlier, allowing switch of coding bit-depth within one same bitstream can offer more flexibilities for practical encoder/decoder devices and provide different tradeoffs between coding performance and computational complexity.

In this section, one adaptive bit-depth switch (ABS) approach is proposed to allow changing the internal coding bit-depth without the requirement of introducing one IRAP picture such as the instantaneous decoder refresh (IDR) picture, etc.

Figure 6:
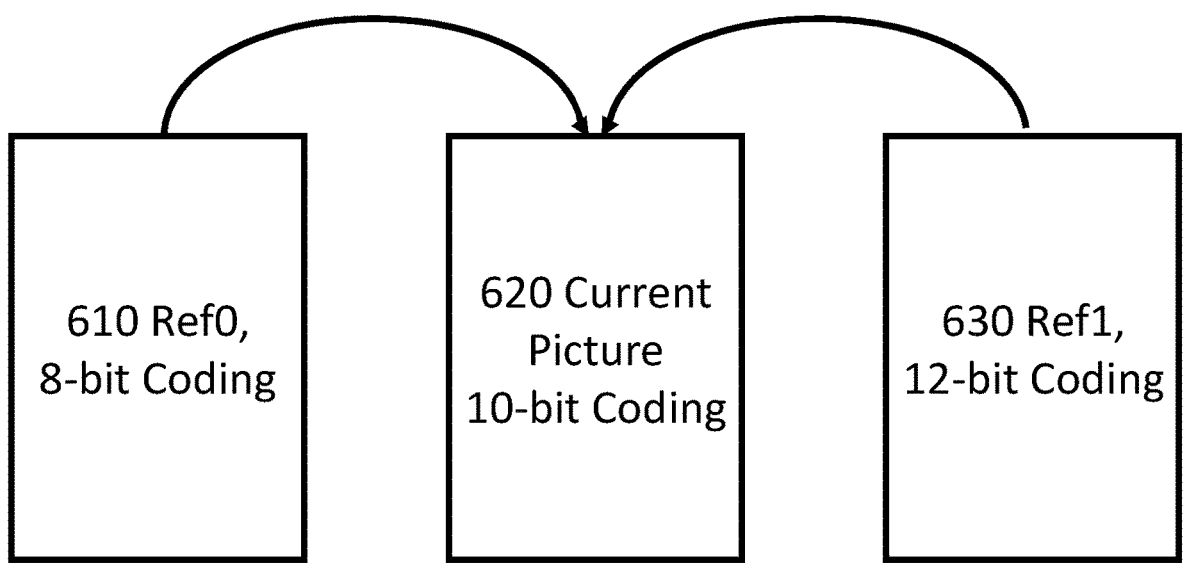
FIG. 6 is a diagram illustration of an adaptive bit-depth switch, according to an example of the present disclosure.

FIG. 6 depicts one hypothetical example where the current picture 620 and its reference pictures 610 and 630 are coded in different internal bit-depths. FIG. 6 shows reference picture 610 Ref0 with 8-bit coding, current picture 620 with 10-bit coding, and reference picture 630 Ref1 with 12-bit coding. Specifically, in the following, high-level syntax signaling and modifications to the motion compensation process are proposed to the current VVC framework in order to support the proposed ABS capability.

High-Level ABS Signaling

For the proposed ABS signaling, in the SPS, one new syntax element sps_max_bit_depth_minus8 is proposed to replace the existing bit-depth syntax element bit_depth_minus8, which specifies the maximum internal coding bit-depth used for the coded pictures that refer to the SPS. Then, when the coding bit-depth is changed, one new PPS syntax pps_bit_depth_minus8 is sent to specify the different coding bit-depth of the pictures referring to the PPS.

There is bitstream conformance that the values of pps_bit_depth_minus8 should not exceed that of sps_max_bit_depth_minus8. Table 19 illustrates the proposed ABS signaling in the SPS and PPS.

TABLE 19

The proposed ABS signaling in the SPS and PPS

| | Descriptor |
|---|---|
| seq_parameter_set_rbsp( ) { | |
| ... | |
| sps_max_bit_depth_minus8 | ue(v) |
| ... | |

TABLE 19-continued

The proposed ABS signaling in the SPS and PPS

| | |
|---|---|
| ~~bit_depth_minus8~~ | ~~ue(v)~~ |
| ... | |
| } | |

| | Descriptor |
|---|---|
| pic_parameter_set_rbsp( ) { | |
| ... | |
| pps_bit_depth_minus8 | ue(v) |
| ... | |
| } | |

Prediction Sample Bit-Depth Adjustment

When there is one coding bit-depth change within one coded video sequence, one current picture may be predicted from another reference picture whose reconstructed samples are represented in different bit-depth precisions. When such a case happens, the prediction samples generated from the motion compensation of the reference picture should be adjusted to the coding bit-depth of the current picture.

Interaction with Other Coding Tools

Given that when the ABS is applied to the reference picture and the current picture may be represented in different precisions, some existing coding tools in the VVC that utilize the reference samples to derive certain coding parameters may not be working properly. For example, in the current VVC, bi-directional optical flow (BDOF) and decoder-side motion vector refinement (DMVR) are two decoder-side technologies that use temporal prediction samples to improve the inter coding efficiency. Specifically, the BDOF tool utilizes the L0 and L1 prediction samples to calculate sample-wise refinements to improve the prediction sample quality, while the DMVR relies on the L0 and L1 prediction samples to refine the motion vector precision at subblock level. Based on the above consideration, it is proposed to always bypass the BDOF and the DMVR process for one inter block when either of two prediction signals is coded in different bit-depth from the current picture.

Figure 9:
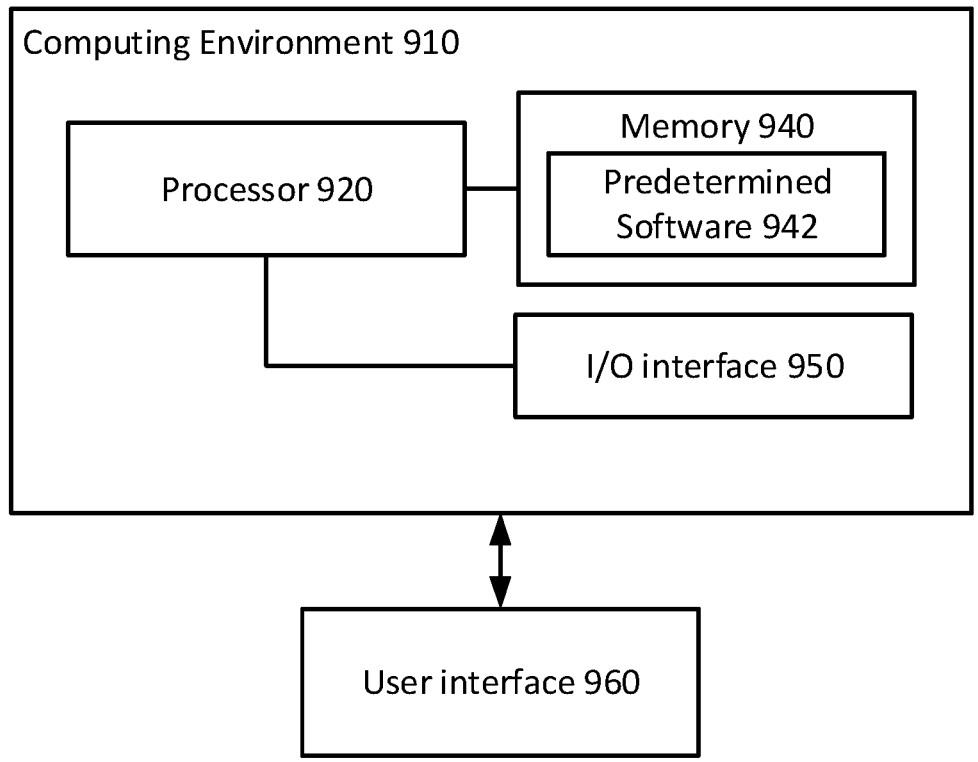
FIG. 9 is a diagram illustrating a computing environment coupled with a user interface, according to an example of the present disclosure.

FIG. 9 shows a computing environment 910 coupled with a user interface 960. The computing environment 910 can be part of data processing server. The computing environment 910 includes processor 920, memory 940, and I/O interface 950.

The processor 920 typically controls overall operations of the computing environment 910, such as the operations associated with the display, data acquisition, data communications, and image processing. The processor 920 may include one or more processors to execute instructions to perform all or some of the steps in the above-described methods. Moreover, the processor 920 may include one or more modules that facilitate the interaction between the processor 920 and other components. The processor may be a Central Processing Unit (CPU), a microprocessor, a single chip machine, a GPU, or the like.

The memory 940 is configured to store various types of data to support the operation of the computing environment 910. Memory 940 may include predetermine software 942. Examples of such data comprise instructions for any applications or methods operated on the computing environment 910, video datasets, image data, etc. The memory 940 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 950 provides an interface between the processor 920 and peripheral interface modules, such as a keyboard, a click wheel, buttons, and the like. The buttons may include but are not limited to, a home button, a start scan button, and a stop scan button. The I/O interface 950 can be coupled with an encoder and decoder.

In an embodiment, there is also provided a non-transitory computer-readable storage medium comprising a plurality of programs, such as comprised in the memory 940, executable by the processor 920 in the computing environment 910, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, where the plurality of programs when executed by the one or more processors, cause the computing device to perform the above-described method for motion prediction.

In an embodiment, the computing environment 910 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

In an embodiment, a method for decoding a video signal comprises: obtaining a reference picture I associated with a video block within the video signal; obtaining reference samples of the video block from the reference picture; determining a luma interpolation filter for an affine motion mode of the video block based on a comparison between resolutions of the reference picture and the current picture; and obtaining luma inter prediction samples of the video block by applying the luma interpolation filter to the reference samples.

In an example of the embodiment, the determining the luma interpolation filter for the affine motion mode of the video block based on the comparison between the resolutions of the reference picture and the current picture comprises determining a first luma interpolation filter for the affine motion mode of the video block in response to the resolution of the reference picture is larger than that of the current picture, wherein the first luma interpolation filter is different from a second luma interpolation filter used for the affine motion mode when the resolution of the reference picture is not larger than that of the current picture.

In an example of the embodiment, the luma interpolation filter is associated with a third luma interpolation filter used for a non-affine motion mode when the resolution of the reference picture is larger than that of the current picture.

In an example of the embodiment, a single filter coefficient of the luma interpolation filter equal to the sum of the first two filter coefficients or the last two filter coefficients of the third luma interpolation filter.

In an example of the embodiment, the method further comprises determining a chroma interpolation filter for an affine motion mode of the video block based on a comparison between resolutions of the reference picture and the current picture; and obtaining the chroma inter prediction samples of the video block by applying the chroma downsampling filter to the reference samples.

In an example of the embodiment, the determining the interpolation filter comprises: obtaining the interpolation filter based on applying a cosine windowed sinc function on top of scalable HEVC test model (SHM) filters.

In an example of the embodiment, the determining the interpolation filter comprises: obtaining a frequency response of an ideal low-pass filter based on a cut-off frequency and scaling ratio; obtaining a cosine window function based on a filter length; and obtaining the downsampling filter based on the frequency response and the cosine window function.

In an example of the embodiment, the cut-off frequency is equal to 0.9, the filter length is equal to 6, and the scaling ratio is equal to 1.5.

In an example of the embodiment, the cut-off frequency is equal to 0.9, the filter length is equal to 6, and the scaling ratio is equal to 2.

In an embodiment, a computing device comprises: one or more processors; and a non-transitory computer-readable storage medium storing instructions executable by the one or more processors, wherein the one or more processors are configured to perform the following acts: obtaining a reference picture I associated with a video block within the video signal; obtaining reference samples of the video block from the reference picture; determining a luma interpolation filter for an affine motion mode of the video block based on a comparison between resolutions of the reference picture and the current picture; and obtaining luma inter prediction samples of the video block by applying the luma interpolation filter to the reference samples.

In an example of the embodiment, the determining the luma interpolation filter for the affine motion mode of the video block based on the comparison between the resolutions of the reference picture and the current picture comprises determining a first luma interpolation filter for the affine motion mode of the video block in response to the resolution of the reference picture is larger than that of the current picture, wherein the first luma interpolation filter is different from a second luma interpolation filter used for the affine motion mode when the resolution of the reference picture is not larger than that of the current picture.

In an example of the embodiment, the luma interpolation filter is associated with a third luma interpolation filter used for a non-affine motion mode when the resolution of the reference picture is larger than that of the current picture.

In an example of the embodiment, a single filter coefficient of the luma interpolation filter equal to the sum of the first two filter coefficients or the last two filter coefficients of the third luma interpolation filter.

In an example of the embodiment, the method further comprises determining a chroma interpolation filter for an affine motion mode of the video block based on a comparison between resolutions of the reference picture and the current picture; and obtaining the chroma inter prediction samples of the video block by applying the chroma downsampling filter to the reference samples.

In an example of the embodiment, the determining the interpolation filter comprises: obtaining the interpolation filter based on applying a cosine windowed sinc function on top of scalable HEVC test model (SHM) filters.

In an example of the embodiment, the determining the interpolation filter comprises: obtaining a frequency response of an ideal low-pass filter based on a cut-off frequency and scaling ratio; obtaining a cosine window function based on a filter length; and obtaining the downsampling filter based on the frequency response and the cosine window function.

In an example of the embodiment, the cut-off frequency is equal to 0.9, the filter length is equal to 6, and the scaling ratio is equal to 1.5.

In an example of the embodiment, the cut-off frequency is equal to 0.9, the filter length is equal to 6, and the scaling ratio is equal to 2.

In an embodiment, a non-transitory computer-readable storage medium stores a plurality of programs for execution by a computing device having one or more processors, wherein the plurality of programs, when executed by the one or more processors, cause the computing device to perform acts comprising: obtaining a reference picture I associated with a video block within the video signal; obtaining reference samples of the video block from the reference picture; determining a luma interpolation filter for an affine motion mode of the video block based on a comparison between resolutions of the reference picture and the current picture; and obtaining luma inter prediction samples of the video block by applying the luma interpolation filter to the reference samples.

In an example of the embodiment, the determining the luma interpolation filter for the affine motion mode of the video block based on the comparison between the resolutions of the reference picture and the current picture comprises determining a first luma interpolation filter for the affine motion mode of the video block in response to the resolution of the reference picture is larger than that of the current picture, wherein the first luma interpolation filter is different from a second luma interpolation filter used for the affine motion mode when the resolution of the reference picture is not larger than that of the current picture.

In an example of the embodiment, the luma interpolation filter is associated with a third luma interpolation filter used for a non-affine motion mode when the resolution of the reference picture is larger than that of the current picture.

In an example of the embodiment, a single filter coefficient of the luma interpolation filter equal to the sum of the first two filter coefficients or the last two filter coefficients of the third luma interpolation filter.

In an example of the embodiment, the method further comprises determining a chroma interpolation filter for an affine motion mode of the video block based on a comparison between resolutions of the reference picture and the current picture; and obtaining the chroma inter prediction samples of the video block by applying the chroma downsampling filter to the reference samples.

In an example of the embodiment, the determining the interpolation filter comprises: obtaining the interpolation filter based on applying a cosine windowed sinc function on top of scalable HEVC test model (SHM) filters.

In an example of the embodiment, the determining the interpolation filter comprises: obtaining a frequency response of an ideal low-pass filter based on a cut-off frequency and scaling ratio; obtaining a cosine window function based on a filter length; and obtaining the downsampling filter based on the frequency response and the cosine window function.

In an example of the embodiment, the cut-off frequency is equal to 0.9, the filter length is equal to 6, and the scaling ratio is equal to 1.5.

In an example of the embodiment, the cut-off frequency is equal to 0.9, the filter length is equal to 6, and the scaling ratio is equal to 2.

The description of the present disclosure has been presented for purposes of illustration, and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for decoding a video signal, comprising:
   obtaining a reference picture associated with a video block within the video signal;
   obtaining reference samples of the video block from the reference picture;
   determining a luma interpolation filter for the video block coded in an affine motion mode based on a scaling ratio derived from resolutions of the reference picture and the current picture, wherein one of filter coefficients of the luma interpolation filter is equal to a sum of first two filter coefficients or last two filter coefficients of filter coefficients of a first luma interpolation filter, wherein the first luma interpolation filter is used for a video block coded in a non-affine motion mode when the resolution scaling ratio is equal to or larger than a first value; and
   obtaining luma inter prediction samples of the video block by applying the luma interpolation filter to the reference samples.

2. The method of claim 1, wherein the determining the luma interpolation filter for the video block coded in the affine motion mode based on the scaling ratio comprises:
   determining a second luma interpolation filter as the luma interpolation filter for the video block coded in the affine motion mode in response to the scaling ratio being equal to or larger than the first value,
   wherein the second luma interpolation filter is different from a third luma interpolation filter used for the video block coded in the affine motion mode when the scaling ratio is not equal to or larger than the first value.

3. The method of claim 1, further comprising:
   determining a chroma interpolation filter for the video block coded in the affine motion mode based on a comparison between resolutions of the reference picture and the current picture; and
   obtaining chroma inter prediction samples of the video block by applying the chroma interpolation filter to the reference samples.

4. The method of claim 1, wherein the determining the luma interpolation filter comprises:
   obtaining the luma interpolation filter based on applying a cosine windowed sinc function on top of scalable HEVC test model (SHM) filters.

5. The method of claim 4, wherein the determining the luma interpolation filter comprises:
   obtaining a frequency response of an ideal low-pass filter based on a cut-off frequency and scaling ratio;

obtaining a cosine window function based on a filter length; and obtaining the down-sampling filter based on the frequency response and the cosine window function.

6. The method of claim 5, wherein the cut-off frequency is equal to 0.9, the filter length is equal to 6, and the scaling ratio is equal to 1.5.

7. The method of claim 5, wherein the cut-off frequency is equal to 0.9, the filter length is equal to 6, and the scaling ratio is equal to 2.

8. A computing device, comprising:

one or more processors; and a non-transitory computer-readable storage medium storing instructions executable by the one or more processors, wherein the one or more processors are configured to:

obtain a reference picture associated with a video block within the video signal;

obtain reference samples of the video block from the reference picture;

determine a luma interpolation filter for the video block coded in an affine motion mode based on a scaling ratio derived from resolutions of the reference picture and the current picture, wherein one of filter coefficients of the luma interpolation filter is equal to a sum of first two filter coefficients or last two filter coefficients of filter coefficients of a first luma interpolation filter, wherein the first luma interpolation filter is used for a video block coded in a non-affine motion mode when the resolution scaling ratio is equal to or larger than a first value; and obtain luma inter prediction samples of the video block by applying the luma interpolation filter to the reference samples.

9. The computing device of claim 8, wherein the one or more processors configured to determine the luma interpolation filter for the video block coded in an affine motion mode based on a scaling ratio are further configured to:

determine a second luma interpolation filter as the luma interpolation filter for the video block coded in the affine motion mode in response to the scaling ratio being equal to or larger than the first value, wherein the second luma interpolation filter is different from a third luma interpolation filter used for the video block coded in the affine motion mode when the scaling ratio is not equal to or larger than the first value.

10. The computing device of claim 8, wherein the one or more processors are further configured to:

determine a chroma interpolation filter for the video block coded in the affine motion mode based on a comparison between resolutions of the reference picture and the current picture; and obtain chroma inter prediction samples of the video block by applying the chroma interpolation filter to the reference samples.

11. The computing device of claim 8, wherein the one or more processors configured to determine the luma interpolation filter are further configured to:

obtain the luma interpolation filter based on applying a cosine windowed sinc function on top of scalable HEVC test model (SHM) filters.

12. The computing device of claim 11, wherein the one or more processors configured to determine the luma interpolation filter are further configured to:

obtain a frequency response of an ideal low-pass filter based on a cut-off frequency and scaling ratio;

obtain a cosine window function based on a filter length; and obtain the down-sampling filter based on the frequency response and the cosine window function.

13. The computing device of claim 12, wherein the cut-off frequency is equal to 0.9, the filter length is equal to 6, and the scaling ratio is equal to 1.5.

14. The computing device of claim 12, wherein the cut-off frequency is equal to 0.9, the filter length is equal to 6, and the scaling ratio is equal to 2.

15. A non-transitory computer-readable storage medium storing a plurality of programs for execution by a computing device having one or more processors, wherein the plurality of programs, when executed by the one or more processors, cause the computing device to perform acts comprising:

obtaining a reference picture associated with a video block within the video signal;

obtaining reference samples of the video block from the reference picture;

determining a luma interpolation filter for the video block coded in an affine motion mode based on a scaling ratio derived from resolutions of the reference picture and the current picture, wherein one of filter coefficients of the luma interpolation filter is equal to a sum of first two filter coefficients or last two filter coefficients of filter coefficients of a first luma interpolation filter, wherein the first luma interpolation filter is used for a video block coded in a non-affine motion mode when the resolution scaling ratio is equal to or larger than a first value; and obtaining luma inter prediction samples of the video block by applying the luma interpolation filter to the reference samples.

16. The non-transitory computer-readable storage medium of claim 15, wherein the plurality of programs further cause the computing device to perform:

determine a second luma interpolation filter as the luma interpolation filter for the video block coded in the affine motion mode in response to the scaling ratio being equal to or larger than the first value, wherein the second luma interpolation filter is different from a third luma interpolation filter used for the video block coded in the affine motion mode when the scaling ratio is not equal to or larger than the first value.

* * * * *